(12) United States Patent
Stewart

(10) Patent No.: US 7,591,135 B2
(45) Date of Patent: *Sep. 22, 2009

(54) METHOD AND SYSTEM FOR USING A MEASURE OF FUELING RATE IN THE AIR SIDE CONTROL OF AN ENGINE

(75) Inventor: Gregory E. Stewart, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/616,977

(22) Filed: Dec. 28, 2006

(65) Prior Publication Data

US 2007/0101977 A1 May 10, 2007

Related U.S. Application Data

(63) Continuation of application No. 11/025,563, filed on Dec. 29, 2004, now Pat. No. 7,165,399.

(51) Int. Cl.
F02D 23/00 (2006.01)
F02B 33/44 (2006.01)
F02M 25/07 (2006.01)

(52) U.S. Cl. .............................. 60/600; 60/601; 60/602; 60/605.2; 123/295; 123/399; 701/104; 701/108

(58) Field of Classification Search ........... 60/600–603, 60/605.2, 607–609, 286; 123/339, 489, 435, 123/674, 1 A, 295, 305, 673, 478, 396, 352, 123/492, 696, 399; 701/103–104, 108; 364/149
See application file for complete search history.

(56) References Cited

U.S. PATENT DOCUMENTS

| 3,744,461 A | | 7/1973 | Davis | |
|---|---|---|---|---|
| 3,969,614 A | * | 7/1976 | Moyer et al. | ............ 123/568.24 |
| 4,005,578 A | | 2/1977 | McInerney | |
| 4,055,158 A | | 10/1977 | Marsee | |
| 4,138,979 A | * | 2/1979 | Taplin | ......................... 123/436 |

(Continued)

FOREIGN PATENT DOCUMENTS

DE 10219382 11/2002

(Continued)

OTHER PUBLICATIONS

"SCR, 400-csi Coated Catalyst," Leading NOx Control Technologies Status Summary, 1 page prior to the filing date of the present application.

(Continued)

*Primary Examiner*—Thai Ba Trieu
(74) *Attorney, Agent, or Firm*—Kris T. Fredrick

(57) ABSTRACT

Methods and systems for using a measure of fueling rate in the air side control of an engine. By using a measure of the fueling rate, the air side control may, for example, anticipate the future air side needs of the engine, and adjust one or more air side parameters to meet the anticipated future air side needs of the engine. This may improve the responsiveness, performance and emissions of the engine.

7 Claims, 14 Drawing Sheets

U.S. PATENT DOCUMENTS

| | | | |
|---|---|---|---|
| 4,252,098 A | 2/1981 | Tomczak et al. | |
| 4,383,441 A | 5/1983 | Willis et al. | |
| 4,418,673 A * | 12/1983 | Tominari et al. | 123/399 |
| 4,426,982 A | 1/1984 | Lehner et al. | |
| 4,434,761 A | 3/1984 | Ludwig | |
| 4,438,497 A | 3/1984 | Willis et al. | |
| 4,456,883 A | 6/1984 | Bullis et al. | |
| 4,462,375 A * | 7/1984 | Isobe et al. | 123/491 |
| 4,485,794 A | 12/1984 | Kimberley et al. | |
| 4,524,745 A * | 6/1985 | Tominari et al. | 123/399 |
| 4,552,116 A * | 11/1985 | Kuroiwa et al. | 123/399 |
| 4,601,270 A | 7/1986 | Kimberley et al. | |
| 4,653,449 A | 3/1987 | Kamei et al. | |
| 4,745,755 A * | 5/1988 | Kawamura | 60/608 |
| 4,771,752 A * | 9/1988 | Nishimura et al. | 123/399 |
| 4,953,530 A * | 9/1990 | Manaka et al. | 123/399 |
| 4,955,199 A * | 9/1990 | Kawamura | 60/608 |
| 5,044,337 A | 9/1991 | Williams | |
| 5,076,059 A * | 12/1991 | Okada | 60/608 |
| 5,076,237 A | 12/1991 | Hartman et al. | |
| 5,089,236 A | 2/1992 | Clerc | |
| 5,108,716 A | 4/1992 | Nishizawa | |
| 5,123,397 A | 6/1992 | Richeson | |
| 5,233,829 A | 8/1993 | Komatsu | |
| 5,253,632 A * | 10/1993 | Brooks | 123/696 |
| 5,282,449 A | 2/1994 | Takahashi et al. | 123/350 |
| 5,349,816 A | 9/1994 | Sanbayashi et al. | |
| 5,365,734 A | 11/1994 | Takeshima | |
| 5,398,502 A | 3/1995 | Watanabe | |
| 5,452,576 A | 9/1995 | Hamburg et al. | |
| 5,457,625 A * | 10/1995 | Lim et al. | 700/29 |
| 5,477,840 A | 12/1995 | Neumann | 123/564 |
| 5,526,645 A | 6/1996 | Kaiser | |
| 5,560,208 A | 10/1996 | Halimi et al. | 60/608 |
| 5,570,574 A | 11/1996 | Yamashita et al. | |
| 5,598,825 A | 2/1997 | Neumann | 123/478 |
| 5,609,139 A | 3/1997 | Ueda et al. | |
| 5,611,198 A | 3/1997 | Lane et al. | |
| 5,611,315 A * | 3/1997 | Dohta et al. | 123/492 |
| 5,672,817 A * | 9/1997 | Sagisaka et al. | 701/103 |
| 5,690,086 A | 11/1997 | Kawano et al. | |
| 5,692,478 A | 12/1997 | Nogi et al. | |
| 5,730,111 A * | 3/1998 | Kaji et al. | 123/673 |
| 5,738,070 A * | 4/1998 | Donaldson et al. | 123/352 |
| 5,746,183 A | 5/1998 | Parke et al. | |
| 5,765,533 A | 6/1998 | Nakajima | |
| 5,771,867 A | 6/1998 | Amstutz et al. | |
| 5,785,030 A | 7/1998 | Paas | |
| 5,788,004 A | 8/1998 | Friedmann et al. | |
| 5,846,157 A | 12/1998 | Reinke et al. | |
| 5,850,738 A | 12/1998 | Hayashi | 60/602 |
| 5,893,092 A | 4/1999 | Driscoll | |
| 5,942,195 A | 8/1999 | Lecea et al. | |
| 5,964,199 A | 10/1999 | Atago et al. | |
| 5,974,788 A | 11/1999 | Hepburn et al. | |
| 5,996,337 A * | 12/1999 | Blosser et al. | 60/286 |
| 6,029,626 A | 2/2000 | Bruestle | |
| 6,035,640 A | 3/2000 | Kolmanovsky et al. | 60/605.2 |
| 6,044,642 A * | 4/2000 | Nishimura et al. | 60/285 |
| 6,048,620 A | 4/2000 | Zhong | |
| 6,055,810 A | 5/2000 | Borland et al. | |
| 6,058,700 A | 5/2000 | Yamashita et al. | |
| 6,067,800 A | 5/2000 | Kolmanovsky et al. | |
| 6,076,353 A | 6/2000 | Freudenberg et al. | |
| 6,095,127 A | 8/2000 | Kolmanovsky et al. | 123/568.21 |
| 6,105,365 A | 8/2000 | Deeba et al. | |
| 6,153,159 A | 11/2000 | Engeler et al. | |
| 6,161,528 A | 12/2000 | Akao et al. | |
| 6,170,259 B1 | 1/2001 | Boegner et al. | |
| 6,171,556 B1 | 1/2001 | Burk et al. | |
| 6,178,743 B1 | 1/2001 | Hirota et al. | |
| 6,178,749 B1 | 1/2001 | Kolmanovsky et al. | 60/605.2 |
| 6,216,083 B1 | 4/2001 | Ulyanov et al. | |
| 6,237,330 B1 | 5/2001 | Takahashi et al. | |
| 6,242,873 B1 | 6/2001 | Drozdz et al. | |
| 6,263,672 B1 | 7/2001 | Roby et al. | |
| 6,273,060 B1 | 8/2001 | Cullen | 123/325 |
| 6,279,551 B1 | 8/2001 | Iwano et al. | 60/605.2 |
| 6,293,092 B1 * | 9/2001 | Ament et al. | 60/286 |
| 6,293,095 B1 * | 9/2001 | Yamamoto et al. | 60/286 |
| 6,312,538 B1 | 11/2001 | Latypov et al. | |
| 6,321,538 B2 | 11/2001 | Hasler | |
| 6,338,245 B1 | 1/2002 | Shimoda et al. | |
| 6,347,619 B1 | 2/2002 | Whiting et al. | |
| 6,360,159 B1 | 3/2002 | Miller et al. | |
| 6,360,541 B2 | 3/2002 | Waszkiewicz et al. | |
| 6,360,732 B1 | 3/2002 | Bailey et al. | |
| 6,379,281 B1 | 4/2002 | Collins et al. | |
| 6,408,624 B1 | 6/2002 | Books et al. | |
| 6,425,371 B2 | 7/2002 | Majima | |
| 6,427,436 B1 | 8/2002 | Allansson et al. | |
| 6,431,160 B1 | 8/2002 | Sugiyama et al. | |
| 6,463,733 B1 | 10/2002 | Asik et al. | |
| 6,463,734 B1 | 10/2002 | Tamura et al. | |
| 6,470,682 B2 | 10/2002 | Gray, Jr. | |
| 6,470,886 B1 | 10/2002 | Jestrabek-Hart | |
| 6,502,391 B1 | 1/2003 | Hirota et al. | |
| 6,512,974 B2 | 1/2003 | Houston et al. | |
| 6,546,329 B2 | 4/2003 | Bellinger | |
| 6,560,528 B1 | 5/2003 | Gitlin et al. | |
| 6,561,158 B2 * | 5/2003 | Yoshida et al. | 123/295 |
| 6,571,191 B1 | 5/2003 | York et al. | |
| 6,579,206 B2 | 6/2003 | Liu et al. | |
| 6,612,293 B2 | 9/2003 | Schweinzer et al. | |
| 6,625,978 B1 | 9/2003 | Eriksson et al. | |
| 6,629,408 B1 | 10/2003 | Murakami et al. | |
| 6,647,710 B2 | 11/2003 | Nishiyama et al. | |
| 6,647,971 B2 | 11/2003 | Vaughan et al. | |
| 6,655,351 B2 * | 12/2003 | Sheidler et al. | 123/396 |
| 6,668,791 B2 * | 12/2003 | Tetsuno et al. | 123/295 |
| 6,671,603 B2 | 12/2003 | Cari et al. | |
| 6,672,060 B1 | 1/2004 | Buckland et al. | |
| 6,679,050 B1 | 1/2004 | Takahashi et al. | |
| 6,687,597 B2 | 2/2004 | Sulatisky et al. | |
| 6,705,084 B2 | 3/2004 | Allen et al. | |
| 6,742,330 B2 | 6/2004 | Genderen | |
| 6,758,037 B2 | 7/2004 | Terada et al. | |
| 6,789,533 B1 | 9/2004 | Hashimoto et al. | |
| 6,823,667 B2 | 11/2004 | Braun et al. | |
| 6,823,675 B2 | 11/2004 | Brunell et al. | |
| 6,826,903 B2 | 12/2004 | Yahata et al. | |
| 6,827,061 B2 | 12/2004 | Nytomt et al. | |
| 6,848,427 B2 * | 2/2005 | Song et al. | 701/104 |
| 6,868,329 B2 | 3/2005 | Ito et al. | |
| 6,953,024 B2 * | 10/2005 | Linna et al. | 123/435 |
| 6,973,382 B2 | 12/2005 | Rodriguez et al. | |
| 7,047,741 B2 * | 5/2006 | Gray, Jr. | 60/603 |
| 7,117,862 B2 * | 10/2006 | May | 123/674 |
| 2001/0002591 A1 | 6/2001 | Majima | |
| 2002/0029564 A1 | 3/2002 | Roth et al. | |
| 2002/0056434 A1 | 5/2002 | Flamig-Vetter et al. | |
| 2002/0073696 A1 | 6/2002 | Kuenstler et al. | 60/295 |
| 2002/0098975 A1 | 7/2002 | Kimura et al. | |
| 2002/0170550 A1 | 11/2002 | Mitsutani | |
| 2002/0173919 A1 | 11/2002 | Moteki et al. | |
| 2002/0184879 A1 | 12/2002 | Lewis | |
| 2002/0194835 A1 | 12/2002 | Bromberg et al. | |
| 2003/0022752 A1 | 1/2003 | Liu et al. | |
| 2003/0041590 A1 | 3/2003 | Kitajima et al. | |
| 2003/0089101 A1 | 5/2003 | Tanaka et al. | |
| 2003/0101713 A1 | 6/2003 | Dalla Betta et al. | |
| 2003/0120410 A1 | 6/2003 | Cari et al. | 701/54 |
| 2003/0143957 A1 | 7/2003 | Lyon | 455/67.1 |
| 2003/0145837 A1 | 8/2003 | Esteghlal et al. | |

| | | | |
|---|---|---|---|
| 2003/0150422 A1 | 8/2003 | Huh | |
| 2003/0172907 A1 | 9/2003 | Nytomt et al. | 123/406.14 |
| 2003/0182940 A1* | 10/2003 | Nishiyama et al. | 60/600 |
| 2003/0200016 A1 | 10/2003 | Spillane et al. | |
| 2003/0213465 A1 | 11/2003 | Fehl et al. | 123/478 |
| 2003/0221679 A1 | 12/2003 | Surnilla | |
| 2003/0225507 A1 | 12/2003 | Tamura | |
| 2004/0006973 A1 | 1/2004 | Makki et al. | |
| 2004/0007211 A1 | 1/2004 | Kobayashi | |
| 2004/0007217 A1 | 1/2004 | Poola et al. | |
| 2004/0025837 A1 | 2/2004 | Hunt et al. | |
| 2004/0034460 A1 | 2/2004 | Folkerts et al. | |
| 2004/0040283 A1 | 3/2004 | Yasui et al. | |
| 2004/0040287 A1 | 3/2004 | Beutel et al. | |
| 2004/0050037 A1 | 3/2004 | Betta et al. | |
| 2004/0055278 A1 | 3/2004 | Miyoshi et al. | |
| 2004/0060284 A1 | 4/2004 | Roberts, Jr. et al. | |
| 2004/0074226 A1 | 4/2004 | Tanaka | |
| 2004/0089279 A1 | 5/2004 | McLaughlin et al. | |
| 2004/0112335 A1 | 6/2004 | Makino et al. | 123/399 |
| 2004/0118117 A1 | 6/2004 | Hartman et al. | 60/602 |
| 2004/0128058 A1 | 7/2004 | Andres et al. | 701/114 |
| 2004/0129259 A1 | 7/2004 | Mitsutani | |
| 2004/0134464 A1 | 7/2004 | Mogi | |
| 2004/0135584 A1 | 7/2004 | Nagy et al. | |
| 2004/0139735 A1 | 7/2004 | Zhu | |
| 2004/0139951 A1 | 7/2004 | Fisher et al. | |
| 2004/0249558 A1 | 12/2004 | Meaney | |
| 2005/0160733 A1 | 7/2005 | Onodera et al. | 60/606 |
| 2006/0196183 A1 | 9/2006 | Isogai | 60/607 |
| 2008/0280511 A1* | 11/2008 | Kado | 701/102 |

FOREIGN PATENT DOCUMENTS

| | | |
|---|---|---|
| EP | 106366 A2 * | 4/1984 |
| EP | 0409247 | 1/1991 |
| EP | 650875 A1 * | 5/1995 |
| EP | 1221544 | 7/2002 |
| EP | 1686251 | 8/2006 |
| JP | 59190443 | 10/1984 |
| JP | 2003329639 | 11/2003 |
| WO | WO 02/101208 | 12/2002 |
| WO | WO 03/065135 | 8/2003 |
| WO | WO 2004/027230 | 4/2004 |

OTHER PUBLICATIONS

Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Bemporad, et al., "Explicit Model Predictive Control," 1 page, prior to filing date of present application.
Borrelli, "Constrained Optimal Control of Linear and Hybrid Systems," Lecture Notes in Control and Information Sciences, vol. 290, 2003.
Catalytica Energy Systems, "Innovative NOx Reduction Solutions for Diesel Engines," 13 pages, $3^{rd}$ Quarter, 2003.
Chatterjee, et al., "Catalytic Emission Control for Heavy Duty Diesel Engines," JM, 46 pages, prior to filing date of present application.
Delphi, Delphi Diesel NOx Trap (DNT), 3 pages, Feb. 2004.

GM "Advanced Diesel Technology and Emissions," powertrain technologies—engines, 2 pages, prior to filing date of present application.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer A Distributed Quadratic Program (DQP) Concepts Reference," 48 pages, prior to filing date of present application.
http://www.not2fast.wryday.com/turbo/glossary/turbo_glossary.shtml, "Not2Fast: Turbo Glossary," 22 pages, printed Oct. 1, 2004.
http://www.tai.cwv.com/sbl106.0.html, "Technical Overview—Advanced Control Solutions," 6 pages, printed Sep. 9, 2004.
Kelly, et al., "Reducing Soot Emissions from Diesel Engines Using One Atmosphere Uniform Glow Discharge Plasma," SAE Paper No. 2003-01-1183, Mar. 2003.
Kolmanovsky, et al., "Issues in Modeling and Control of Intake Flow in Variable Geometry Turbocharged Engines", $18^{th}$ IFIP Conf. System Modeling and Optimization, pp. 436-445, Jul. 1997.
Kulhavy, et al. "Emerging Technologies for Enterprise Optimization in the Process Industries," Honeywell, 12 pages, Dec. 2000.
Locker, et al., "Diesel Particulate Filer Operational Characterization," Corning Incorporated, 10 pages, prior to filing date of present application.
Lu "Challenging Control Problems and Engineering Technologies in Enterprise Optimization," Honeywell Hi-Spec Solutions, 30 pages, Jun. 4-6, 2001.
Moore, "Living with Cooled-EGR Engines," Prevention Illustrated, 3 pages, Oct. 3, 2004.
National Renewable Energy Laboratory (NREL), "Diesel Emissions Control- Sulfur Effects Project (DECSE) Summary of Reports," U.S. Department of Energy, 19 pages, Feb. 2002.
Salvat, et al., "Passenger Car Serial Application of a Particulate Filter System on Common Rail Direct Injection Engine," SAE Paper No. 2000-01-0473, 14 pages, Feb. 2000.
Shamma, et al. "Approximate Set-Valued Obeservers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Storset, et al., "Air Charge Estimation for Turbocharged Diesel Engines," vol. 1, Proceedings of the American Control Conference, 8 pages, Jun. 28-30, 2000.
The MathWorks, "Model-Based Calibration Toolbox 2.1 Calibrate complex powertrain systems," 4 pages, printed prior to filing date of present application.
The MathWorks, "Model-Based Calibration Toolbox 2.1.2," 2 pages, prior to filing date of present application.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Zenlenka, et al., "An Active Regeneration as a Key Element for Safe Particulate Trap Use," SAE Paper No. 2001-0103199, 13 pages, Feb. 2001.

* cited by examiner

METHOD AND SYSTEM FOR USING A MEASURE OF FUELING RATE IN THE AIR SIDE CONTROL OF AN ENGINE

The present invention is a continuation of U.S. patent application Ser. No. 11/025,563, entitled "Method and System for Using a Measure of Fueling Rate in the Air Side Control of an Engine", filed on Dec. 29, 2004.

TECHNICAL FIELD

The present invention generally relates to engines, and more particularly, to methods for controlling engines.

BACKGROUND

Spark ignition engines typically have a gas pedal that is mechanically connected to an air throttle that meters air into engine. Stepping on the gas pedal typically opens the air throttle, which allows more air into the engine. In some cases, a fuel injector controller adjusts the fuel that is provided to the engine to maintain a desired air/fuel ratio (AFR). The AFR is typically held close to a stoichiometric ratio to produce stoichiometric combustion, which helps minimizes engine emissions and allows three-way catalysts to simultaneously remove hydrocarbons, carbon monoxide, and oxides of nitrogen (NOX).

Compression ignition engines (e.g. diesel engines) typically do not operate at stoichiometric ratios, and thus greater emissions and different emission components often result. Because diesel engines are now making real headway into the car and light truck markets, federal regulations have been passed requiring more stringent emission levels for diesel engines.

Unlike spark ignition engines, the gas pedal of a diesel engine is typically not directly connected to an air throttle that meters air into engine. Instead, in diesel engines with electronic fuel injection (EFI), the pedal position is sensed by a pedal position sensor, and the sensed pedal position is used to control the fuel rate provided to the engine, which allows more or less fuel per fuel pump shot. In many modern diesel engines, the air to the engine is typically controlled by a turbocharger, often a Variable Nozzle Turbocharger (VNT) or waste-gate turbocharger.

In many diesel engines, there is a time delay, or "turbo-lag", between when the operator moves the pedal—injecting more fuel—and when the turbocharger spins-up to provide the additional air required to produce the desired air-fuel ratio. This "turbo-lag" can reduce the responsiveness and performance of the engine, and can increase emissions from the engine.

There are typically no sensors in the exhaust stream of a diesel engine that are analogous to those emissions sensors found in spark ignition engines. One reason for this is that diesel engines typically operate at about twice as lean as spark ignition engines. As such, the oxygen level in the exhaust of a diesel engine can be at a level where standard emission sensors do not provide useful information. At the same time, diesel engines typically burn too lean for conventional three-way catalysts. As such, control over combustion in a diesel engine is often performed in an "open-loop" manner, often relying on engine maps or the like to generate set points for the intake manifold parameters that are believed to be favorable for acceptable exhaust emissions.

In any event, after treatment is often required to help clean up exhaust emissions in a diesel engine. In many cases, after treatment includes a "flow through oxidation" catalyst system, which typically does not have any controls. Hydrocarbons, carbon monoxide and most significantly those hydrocarbons that are adsorbed on particulates can sometimes be cleaned up when the conditions are right. Some after treatment systems include particulate filters. These particulate filters, however, must typically be periodically cleaned often by burning off the soot particulate which has been collected on the filter to "Regenerate" the filter surface. Increasing the exhaust gas temperature is the primary way to initiate Regeneration, and injecting additional fuel in-cylinder or into an exhaust burner is one method. The control of this type of after-treatment may be based on a pressure sensor or on distance traveled, often in an open loop manner.

SUMMARY

The present invention relates to methods and systems for using a measure of fueling rate in the air side control of an engine. By using a measure of the fueling rate, the present invention may, for example, anticipate future air side needs of the engine, and adjust one or more air side parameters to meet the anticipated future air side needs of the engine. This may help improve the responsiveness, performance and emissions of the engine.

In one illustrative embodiment, the present invention may be adapted for use with an internal combustion engine that has an intake manifold fluidly coupled to a turbocharger. The turbocharger may have an effect on the intake manifold air pressure (MAP) and the intake manifold air flow (MAF). The internal combustion engine may also have one or more fuel injectors for injecting fuel into the intake manifold of the engine.

One illustrative embodiment of the present invention may include injecting a fueling profile into the internal combustion engine using the one or more fuel injectors. One or more signals that are related to the fueling profile are provided to an air side controller, and the air side controller adjusts one or more air side parameters, such as manifold air pressure (MAP) and/or manifold air flow (MAF), based at least in part on the one or more signals that are related to the fueling profile. For example, if the current fueling profile includes a relatively sharp increase in fueling rate, the air side controller may increase the manifold air pressure (MAP) and/or manifold air flow (MAF) with little or no delay to help maintain a desired AFR profile and/or emissions profile. This may help, for example, to reduce the effects of turbo lag and may help reduce emissions and within desired bounds, particularly during transients in engine operation.

In some cases, the turbocharger may have an intake manifold pressure profile that at least in part defines the air that is provided to the intake manifold of the engine. The air side controller may adjust the intake manifold pressure profile, based on the one or more signals that are related to the fueling profile, to effect the desired change in the manifold air pressure (MAP) and/or manifold air flow (MAF) in the intake manifold. When the turbocharger is a variable nozzle turbocharger (VNT) having a VNT set point, the intake manifold pressure profile may be adjusted by adjusting the VNT set point. In some cases, the turbocharger may include an electric motor assist, and the intake manifold pressure profile may be adjusted by adjusting the electric motor assist, if desired.

In some embodiments, the internal combustion engine may have an exhaust gas recirculation (EGR) valve that receives exhaust gas from the exhaust manifold and provides an amount of the exhaust gas to the intake manifold, wherein the recirculation amount is set by the set point of the EGR valve. It is contemplated that the air side controller may adjust the set point of the EGR valve, based on the one or more signals that are related to the fueling profile, to effect a desired change in the air composition of the air that is provided to the intake manifold.

In some embodiments, one or more exhaust sensors may be provided for sensing one or more exhaust parameters related to the composition of the exhaust gas coming from the internal combustion engine. In these embodiments, it is contemplated that the air side controller may adjust one or more air side parameters, such as manifold air pressure (MAP), manifold air flow (MAF) and/or EGR level, to effect a future value of at least one of the one or more sensed exhaust parameters. In some cases, the one or more sensed exhaust parameters may include, for example, a NOX concentration and/or a PM concentration. By using the one or more exhaust sensors, along with the one or more fueling profile signals, the air side controller may anticipate the future air side needs of the engine, and may make adjustments to help keep the one or more sensed exhaust parameters at a desired level or within a desired range. The air side controller may adjust any number of engine parameters such as MAP, MAF, EGR, etc. to help keep the one or more sensed exhaust parameters at the desired level or within the desired range.

The above summary is not intended to describe each disclosed embodiment or every implementation of the present invention. The Figures, Detailed Description and Examples which follow more particularly exemplify these embodiments.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the Figures thereof and wherein.

DETAILED DESCRIPTION OF THE DRAWINGS

Figure 1:
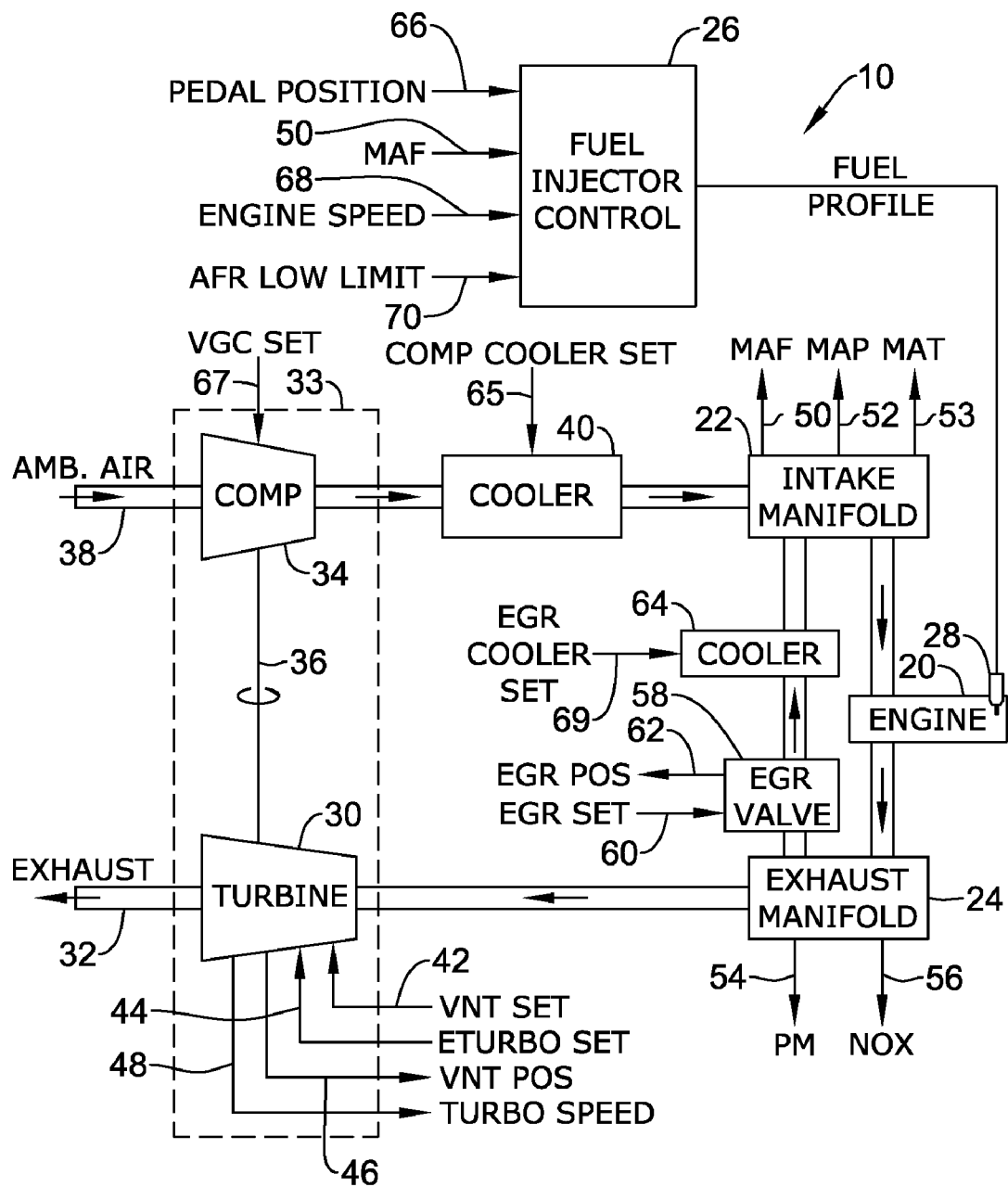
FIG. 1 is a schematic view of an illustrative diesel engine system in accordance with the present invention.

FIG. 1 is a schematic view of an illustrative diesel engine system in accordance with the present invention. The illustrative diesel engine system is generally shown at 10, and includes a diesel engine 20 that has an intake manifold 22 and an exhaust manifold 24. In the illustrative embodiment, a fuel injector 28 provides fuel to the engine 20. The fuel injector 28 may be a single fuel injector, but more commonly may include a number of fuel injectors that are independently controllable. A fuel injector controller 26 is provided to control the fuel injector(s) 38 such that the fuel injector(s) 38 provide a desired fuel profile to the engine 20. The term fuel "profile", as used herein, may include any number of fuel parameters or characteristics including, for example, fuel delivery rate, change in fuel delivery rate, fuel timing, fuel pre-injection event(s), fuel post-injection event(s), fuel pulses, and/or any other fuel delivery characteristic, as desired. One or more fuel side actuators may be used to control these and other fuel parameters, as desired.

The fuel injector controller 26 may receive and use any number of input signals to produce the desired fuel profile. For example, the illustrative fuel injector controller 26 receives a pedal position signal 66, an intake Manifold Air Flow (MAF) signal 50, an Engine Speed signal 68, and an Air-Fuel-Ratio (AFR) Low Limit signal 70. These signals are only illustrative. For example, and in some cases, the fuel injector controller 26 may receive one or more control signals from an air-side controller (see FIG. 2), but this is not required.

In the illustrative embodiment, exhaust from the engine 20 is provided to the exhaust manifold 24, which delivers the exhaust gas down an exhaust pipe 32. In the illustrative embodiment, a turbocharger 33 is provided downstream of the exhaust manifold 24. The illustrative turbocharger 33 includes a turbine 30, which is driven by the exhaust gas flow. In the illustrative embodiment, the rotating turbine 30 drives a compressor 34 through a mechanical coupling 36. The compressor receives ambient air through passageway 38, compresses the ambient air, and provides compressed air to the intake manifold 22, as shown.

The turbocharger 33 may be a variable nozzle turbine (VNT) turbocharger. However, it is contemplated that any suitable turbocharger may be used including, for example, a waste gated turbocharger, or a variable geometry inlet nozzle turbocharger (VGT) with an actuator to operate the waste gate or VGT vane set. The illustrative VNT turbocharger uses adjustable vanes inside an exhaust scroll to change the angle of attack of the incoming exhaust gasses as they strike the exhaust turbine 30. In the illustrative embodiment, the angle of attack of the vanes, and thus the amount of boost (MAP) pressure provided by the compressor 34, may be controlled by a VNT SET signal 42. In some cases, a VNT position signal 46 is provided to indicate the current vane position. A turbo speed signal 48 may also be provided to indicate the current turbine speed. In some cases, it may be desirable to limit the turbo speed to help prevent damage to the turbine 30.

To help reduce turbo lag, the turbine 30 may include an electrical motor assist (not explicitly shown). However, this is not required in all embodiments. The electric motor assist may help increase the speed of the turbine 30 and thus the boost pressure provided by the compressor 34 to the intake manifold 22. This may be particularly useful when the engine is at low engine RPMs and when higher boost pressure is desired, such as under high acceleration conditions. Under these conditions, the exhaust gas flow may be insufficient to generate the desired boost (MAP) pressure at the intake manifold 22. In the illustrative embodiment, an ETURBO signal may be provided to control the amount of electric motor assist that is provided.

It is contemplated that the compressor 34 may be a variable or non-variable compressor. For example, in some cases, the compressed air that is provided by the compressor 34 may be only a function of the speed at which the turbine 30 rotates the compressor 34. In other cases, the compressor 34 may be a variable geometry compressor (VGC), where in some cases, a VGC SET signal 67 is used to set the vane position at the outlet of the compressor to provide a controlled amount of compressed air to the intake manifold 22.

A compressed air cooler 40 may be provided to help cool the compressed air before the compressed air is provided to the intake manifold 22, as desired. In some embodiments, one or more compressed air cooler control signals 65 may be provided to the compressed air cooler 40 to help control the temperature of the compressed air that is ultimately provided to the intake manifold 22. In some cases, the one or more compressed air cooler control signals 65 may be provided by an air side controller (see FIG. 2), if desired.

In some cases, and to reduce the emissions of some diesel engines, an Exhaust Gas Recirculation (EGR) Valve 58 may be inserted between the exhaust manifold 24 and the intake manifold 22, as shown. In the illustrative embodiment, the EGR valve 58 accepts an EGR SET signal 60, which is used to set the desired amount of exhaust gas recirculation (EGR). An EGR POSITION output signal 62 may also be provided, if desired, which may indicate the current position of the EGR valve 58.

In some cases, an EGR cooler 64 may be provided either upstream or downstream of the EGR valve 58 to help cool the exhaust gas before it is provided to the intake manifold 22. In some embodiments, one or more EGR cooler control signals 69 may be provided to the EGR cooler 64 to help control the temperature of the recirculated exhaust gas. In some cases, the one or more EGR cooler control signals 69 may be provided by an air side controller (see FIG. 2), if desired.

A number of sensors may be provided for monitoring the operation of the engine 20. For example, an intake manifold air flow (MAF) sensor 50 may provide a measure of the intake manifold air flow (MAF). An intake manifold air pressure (MAP) sensor 52 may provide a measure of the intake manifold air pressure (MAP). A manifold air temperature (MAT) sensor 53 may provide a measure of the intake manifold air temperature (MAT). A NOX sensor 56 may provide a measure of the NOX concentration in the exhaust gas. Similarly, a Particular Matter (PM) sensor 54 may provide a measure of the particulate matter concentration in the exhaust gas. While the NOX sensor 56 and the PM sensor 54 are shown located at the exhaust manifold 24, it is contemplated that these sensors may be provided anywhere downstream of the engine 20, as desired. In addition, the sensors shown in FIG. 1 are only illustrative, and it is contemplated that more or less sensors may be provided, as desired.

Figure 2:
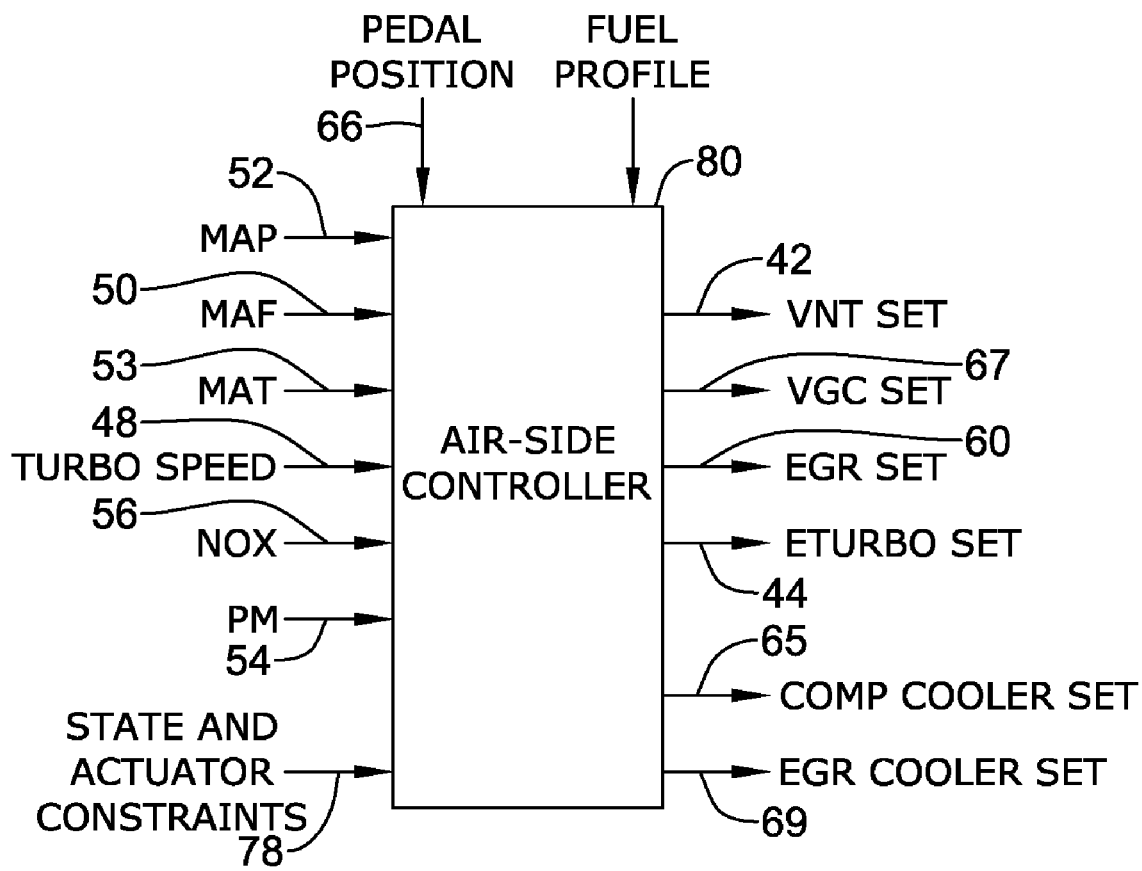
FIG. 2 is a schematic view of an illustrative air-side controller for use with the illustrative diesel engine system of FIG. 1.

FIG. 2 is a schematic view of an illustrative air-side controller for use with the illustrative diesel engine system of FIG. 1. The illustrative air-side controller is generally shown at 80, and receives a number of engine parameters to help provide air-side control to the engine 20. For example, and in one illustrative embodiment, the air-side controller 80 receives input signals such as the MAP sensor output 52, the MAF sensor output 50, the MAT sensor output 53, the turbo speed signal 48, the NOX sensor output 56 and/or the PM sensor output 54, all shown in FIG. 1. These input parameters are only illustrative, and it is contemplated that more or less input parameters may be received, depending on the application. For example, an in some illustrative embodiments, the air-side controller 80 may receive a pedal position signal 66 and/or a fuel profile signal as shown, but this is not required or even desired in some embodiments.

Based on the value of the received input parameters, the illustrative air-side controller 80 may provide a number of control outputs to help provide air-side control to the engine 20. For example, the air-side controller 80 may provide the VNT SET signal 42, the EGR SET signal 60, and in some cases, the COMP. COOLER SET signal, the EGR COOLER Set signal, and the ETURBO signal 44 shown in FIG. 1.

In some cases, the air-side controller may be a multivariable Model Predictive Controller (MPC). The MPC may include a model of the dynamic process of engine operation, and provide predictive control signals to the engine subject to constraints in control variables and measured output variables. The models may be static and/or dynamic, depending on the application. In some cases, the models produce one or more output signals y(t) from one or more input signals u(t). A dynamic model typically contains a static model plus information about the time response of the system. Thus, a dynamic model is often of higher fidelity than a static model.

In mathematical terms, a linear dynamic model has the form:

$$y(t)=B0*u(t)+B1*u(t-1)+ \ldots +Bn*u(t-n)+A1*y(t-1)+ \ldots +Am*y(t-m)$$

where B0 ... Bn, and A1 ... Am are constant matrices. In a dynamic model, y(t) which is the output at time t, is based on the current input u(t), one or more past inputs u(t−1), ... u(t−n), and also on one or more past outputs y(t−1)...y(t−m).

A static model is a special case where the matrices B1= ... =Bn=0, and A1= ... =Am=0, which is given by the simpler relationship:

$$y(t)=B0u(t)$$

A static model as shown is a simple matrix multiplier. A static model typically has no "memory" of the inputs u(t−1), u(t−2) ... or outputs y(t−1) ... etc. As a result, a static model can be simpler, but may be less powerful in modeling some dynamic system parameters.

For turbocharged diesel system, the system dynamics can be relatively complicated and several of the interactions may have characteristics known as "non-minimum phase". This is a dynamic response where the output y(t), when exposed to a step in input u(t), will initially move in one direction, and then turn around and move towards its steady state in the opposite direction. The soot emission in a diesel engine is just one example. In some cases, these dynamics may be important for optimal operation of the control system. Thus, dynamic models are often preferred, at least when modeling some control parameters.

In one example, the MPC may include a multivariable model that models the effect of changes in one or more actuators of the engine (e.g. VNT SET, EGR SET, COMP COOLER SET, EGR COOLER SET, ETURBO SET, Fueling Rate, etc.) on each of two or more parameters (e.g. AFR, MAP, MAF, NOX, PM), and the multivariable controller may then control the actuators to produce a desired response in the two or more parameters. Likewise, the model may, in some cases, model the effects of simultaneous changes in two or more actuators on each of one or more engine parameters, and the multivariable controller may control the actuators to produce a desired response in each of the one or more parameters.

For example, an illustrative state-space model of a discrete time dynamical system may be represented using equations of the form:

$$x(t+1)=Ax(t)+Bu(t)$$

$$y(t)=Cx(t)$$

The model predictive algorithm involves solving the problem:

$$u(k)=\arg\min\{J\}$$

Where the function J is given by, $$J = \hat{x}(t+N_y|t)^T P\hat{x}(t+N_y|t) + \sum_{k=0}^{N_y-1}[\hat{x}(t+k|t)^T Q\hat{x}(t+k|t) + u(t+k)^T Ru(t+k)]$$

Subject to Constraints $$y_{min} \leq \hat{y}(t+k|t) \leq y_{max}$$

$$u_{min} \leq u(t+k) \leq u_{max}$$

$$x(t|t)=x(t)$$

$$\hat{x}(t+k+1|t)=A\hat{x}(t+k|t)+Bu(t+k)$$

$$\hat{y}(t+k|t)=C\hat{x}(t+k|t)$$

In some embodiments, this is transformed into a Quadratic Programming (QP) problem and solved with standard or customized tools.

The variable "y(k)" contains the sensor measurements (for the turbocharger problem, these include but are not limited to MAP, MAF, MAT, turbospeed, NOx emissions, PM emissions, etc). The variables ŷ(k+t|t) denote the outputs of the system predicted at time "t+k" when the measurements "y(t)" are available. They are used in the model predictive controller to choose the sequence of inputs which yields the "best" (according to performance index J) predicted sequence of outputs.

The variables "u(k)" are produced by optimizing J and, in some cases, are used for the actuator set points. For the turbocharger problem these include, but are not limited to, the VNT SET, EGR SET, COMP COOLER SET, EGR COOLER SET, ETURBO, etc. The variable "x(k)" is a variable representing an internal state of the dynamical state space model of the system. The variable x̂(t+k|t) indicates the predicted version of the state variable k discrete time steps into the future and is used in the model predictive controller to optimize the future values of the system.

The variables $y_{min}$ and $y_{max}$ are constraints and indicate the minimum and maximum values that the system predicted measurements ŷ(k) are permitted to attain. These often correspond to hard limits on the closed-loop behavior in the control system. For example, a hard limit may be placed on the PM emissions such that they are not permitted to exceed a certain number of grams per second at some given time. In some cases, only a minimum $y_{min}$ or maximum $y_{max}$ constraint is provided. For example, a maximum PM emission constraint may be provided, while a minimum PM emission constraint may be unnecessary or undesirable.

The variables $u_{min}$ and $U_{max}$ are also constraints, and indicate the minimum and maximum values that the system actuators û(k) are permitted to attain, often corresponding to physical limitations on the actuators. For example, the EGR valve may have a minimum of zero corresponding to a fully closed valve position and a maximum value of one corresponding to the fully open valve position. Like above, in some cases and depending on the circumstances, only a minimum $u_{min}$ or maximum $u_{max}$ constraint may be provided. Also, some or all of the constraints (e.g. $y_{min}$, $y_{max}$, $u_{min}$, $u_{max}$) may vary in time, depending on the current operating conditions. The state and actuator constraints may be provided to the air-side controller 80 of FIG. 2 via interface 78, if desired.

The constant matrices P, Q, R are often positive definite matrices used to set a penalty on the optimization of the respective variables. These are used in practice to "tune" the closed-loop response of the system.

Figure 3:
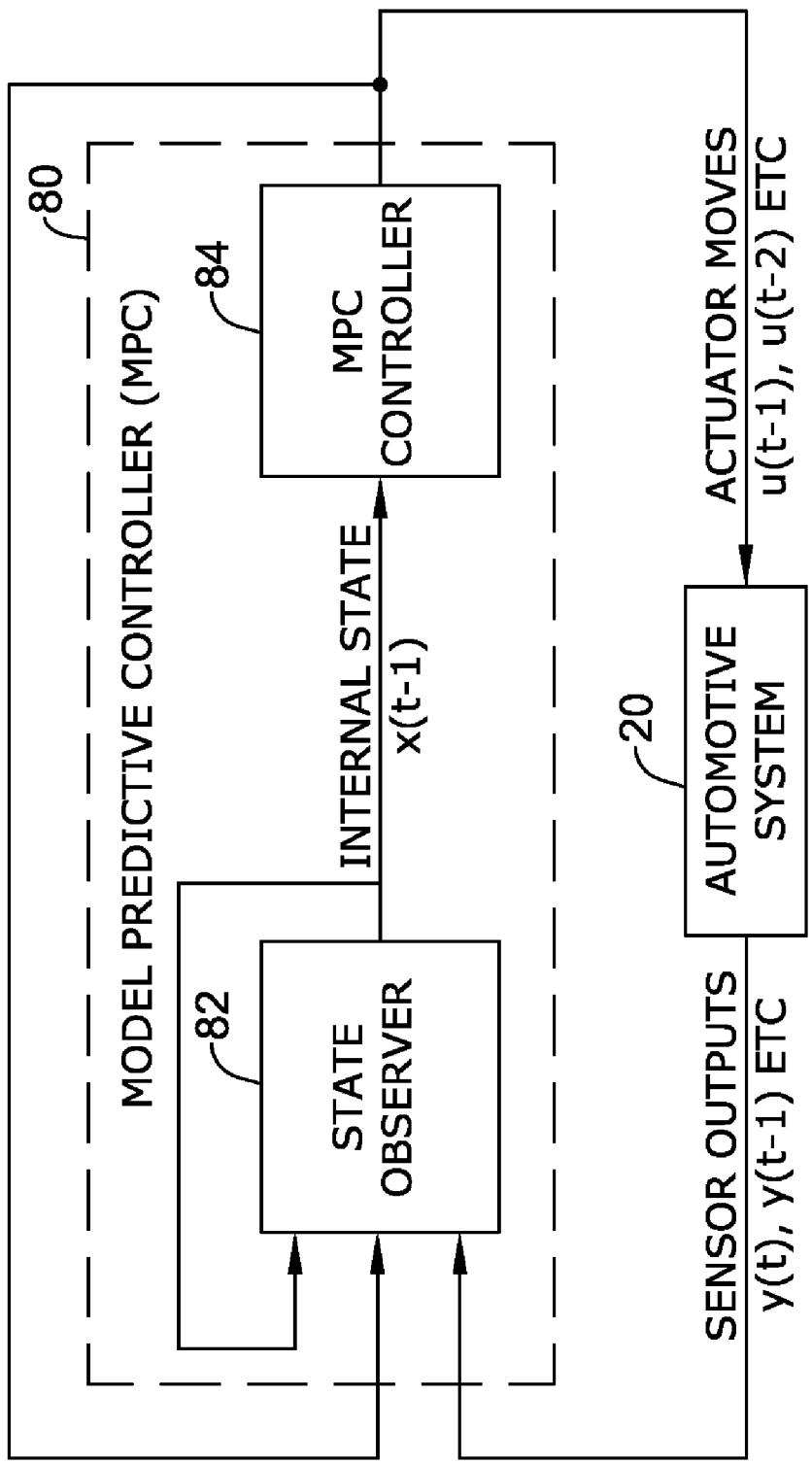
FIG. 3 is a schematic view of an illustrative model predictive controller in accordance with the present invention.

FIG. 3 is a schematic view of an illustrative model predictive controller in accordance with the present invention. In this embodiment, the MPC 80 includes a State Observer 82 and a MPC Controller 84. As described above, the MPC Controller 84 provides a number of control outputs "u" to actuators or the like of the engine 20. Illustrative control outputs include, for example, the VNT SET signal 42, the EGR SET signal 60, the COMP COOLER SET signal 65, the EGR COOLER SET signal 69, and the ETURBO SET signal 44, all shown in FIGS. 1 and 2. The MPC Controller 84 may include a memory for storing past values of the control outputs u(t), u(t–1), u(t–2), etc.

The State Observer 82 receives a number of inputs "y", a number of control outputs "u", and a number of internal variables "x". Illustrative inputs "y" include, for example, the MAP sensor output 52, the MAF sensor output 50, a Manifold Air Temperature (MAT) signal 53, the turbo speed signal 48, the NOX sensor output 56, and/or the PM sensor output 54, shown and described above with respect to FIGS. 1 and 2. It is contemplated that the inputs "y" may be interrogated constantly, intermittently, or periodically, or at any other time, as desired. Also, these input parameters are only illustrative, and it is contemplated that more or less input signals may be provided, depending on the application. In some cases, the State Observer 82 may receive present and/or past values for each of the number of inputs "y", the number of control outputs "u", and a number of internal state variables "x", depending on the application.

The State Observer 82 produces a current set of state variables "x", which are then provided to the MPC Controller 84. The MPC Controller 84 then calculates new control outputs "u", which are presented to actuators or the like on the engine 20. The control outputs "u" may be updated constantly, intermittently, or periodically, or at any other time, as desired. The engine 20 operates using the new control outputs "u", and produces new inputs "y".

In one illustrative embodiment, the MPC 80 is programmed using standard Quadratic Programming (QP) and/or Linear Programming (LP) techniques to predict values for the control outputs "u" so that the engine 20 produces inputs "y" that are at a desired target value, within a desired target range, and/or do not violate any predefined constraints. For example, by knowing the impact of the VNT SET position 42, the EGR SET position 60 and/or the ETURBO SET signal 44 on the NOX and/or PM emissions, the MPC 80 may predict values for the control outputs VNT SET position 42, EGR SET position 60 and/or the ETURBO SET signal 44 so that future values of the NOX 56 and/or PM emissions signals 54 are at or remain at a desired target value, within a desired target range, and/or do not violate current constraints. This prediction capability may be particularly useful since there is often a "turbo lag" (e.g. 1 second) from when a change in the VNT SET position 42, EGR SET position 60 and/or the ETURBO SET signal occurs and when the resulting change in the NOX and/or PM emissions signals 56 and 54 occurs. In some cases, the constraints may change, and may depend on the current operating conditions.

It is contemplated that the MPC 80 may be implemented in the form of online optimization and/or by using equivalent lookup tables computed with a hybrid multi-parametric algorithm. Hybrid multi-parametric algorithms may allow constraints on emission parameters as well as multiple system operating modes to be encoded into a lookup table which can be implemented in an Engine Control Unit (ECU) of a vehicle. The emission constraints can be time-varying signals which enter the lookup table as additional parameters. Hybrid multi-parametric algorithm are further described by F. Borrelli in "*Constrained Optimal Control of Linear and Hybrid Systems*", volume 290 of Lecture Notes in Control and Information Sciences, Springer, 2003, which is incorporated herein by reference.

Alternatively, or in addition, the MPC 80 may include one or more Proportional-Integral-Derivative (PID) control loops, one or more predictive constrained control loops—such as a Smith predictor control loop, one or more multi-parametric control loops, one or more multivariable control loops, one or more dynamic matrix control loops, one or more statistical processes control loop, a knowledge based expert system, a neural network, fuzzy logic or any other suitable control mechanism, as desired. Also, it is contemplated that the MPC may provide commands and/or set points for lower-level controllers that are used to control the actuators of the engine. In some cases, the lower level controllers may be, for example, single-input-single-output (SISO) controllers such as PID controllers.

Figure 4:
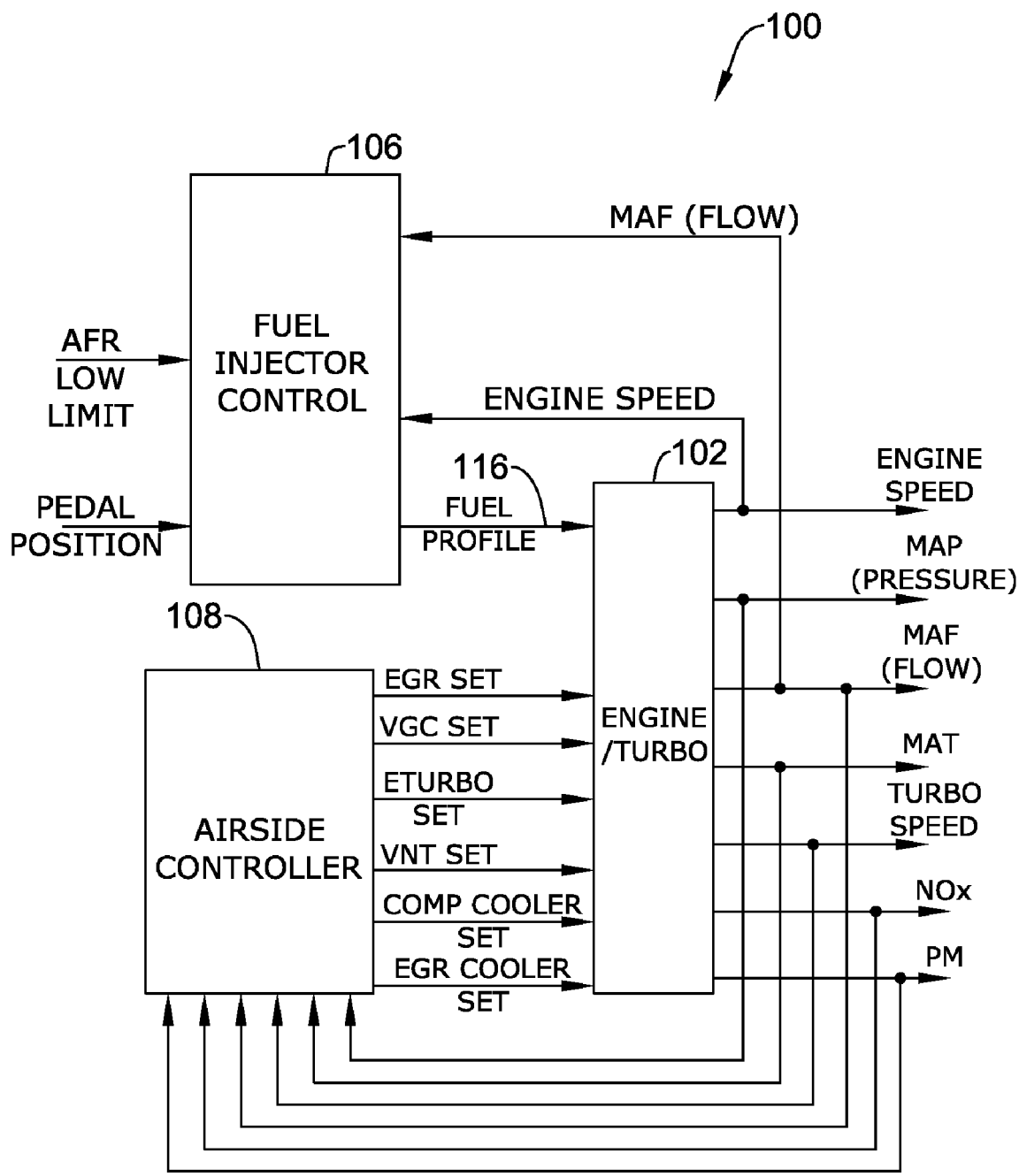
FIG. 4 is a schematic view of another illustrative diesel engine system in accordance with the present invention.

FIG. 4 is a schematic view of another illustrative diesel engine system in accordance with the present invention. This illustrative diesel engine system is generally shown at 100, and includes a diesel engine 102 that includes a variable nozzle turbine (VNT) turbocharger with electric motor assist and an Exhaust Gas Recirculation (EGR) Valve that is inserted between the engines' exhaust manifold and the intake manifold. A number of sensor outputs are provided for monitoring various parameters of the engine during operation. The illustrative sensor outputs include, for example, an engine speed parameter, an intake manifold air pressure (MAP) parameter, an intake manifold air flow (MAF) parameter, a turbo speed parameter, an NOX parameter and a PM parameter, as shown. These are only illustrative, and it is contemplated that more or less sensor outputs may be provided, depending on the application.

A fuel injector controller 106 is provided for controlling the fuel that is injected into the engine. The illustrative fuel injector controller 106 may include an air-fuel-ratio (AFR) estimator that receives the intake manifold air flow (MAF) parameter and a fuel rate parameter to estimate the air-fuel-ratio (AFR) going into the engine. In some cases, the air-fuel-ratio (AFR) estimator may keep the estimated AFR above a minimum AFR LOW LIMIT value, which if may help reduce smoke or other undesirable emissions that may occur at low AFR values.

The fuel injector controller 106 may control the fuel rate delivered by the fuel injectors to the engine. In some cases, a pedal position signal and an engine speed signal are used to calculate the desired amount of fuel for the engine. In some cases, stepping on the pedal increases the fuel flow in a manner dictated by one or more static and/or dynamic control maps.

In the illustrative embodiment, an air side controller 108 may also be provided. The air side controller 108 may receive a number of engine parameters to help provide air-side control to the engine 102. The term "air-side control" may include both intake air and exhaust or emission control. For example, and in the illustrative embodiment, the air-side controller 108 may receive input signals such as the MAP sensor output, the MAF sensor output, the MAT sensor output, the turbo speed signal, the NOX sensor output and the PM sensor output. These input parameters are only illustrative, and it is contemplated that more or less input signals may be received, depending on the application. Note that in this illustrative embodiment, the air side controller 108 does not receive a measure of the fueling profile 116 provided by the fuel injector controller 106. In other embodiments, however, such as those shown and described below with respect to FIGS. 11-14, the air side controller may receive a measure of the fueling profile as an input.

In any event, based on the value of the received input parameters, and in some cases on one or more past received input parameters, the illustrative air-side controller 108 may provide a number of control outputs to help provide air-side control to the engine 102. For example, the air-side controller 108 may provide a VNT SET signal, an EGR SET signal, a VGC SET signal, an ETURBO SET signal, a COMP COOLER SET signal, an EGR COOLER SET signal, etc. In some cases, the air side controller 108 may be similar to the air side controller 80 of FIG. 2.

Figure 5:
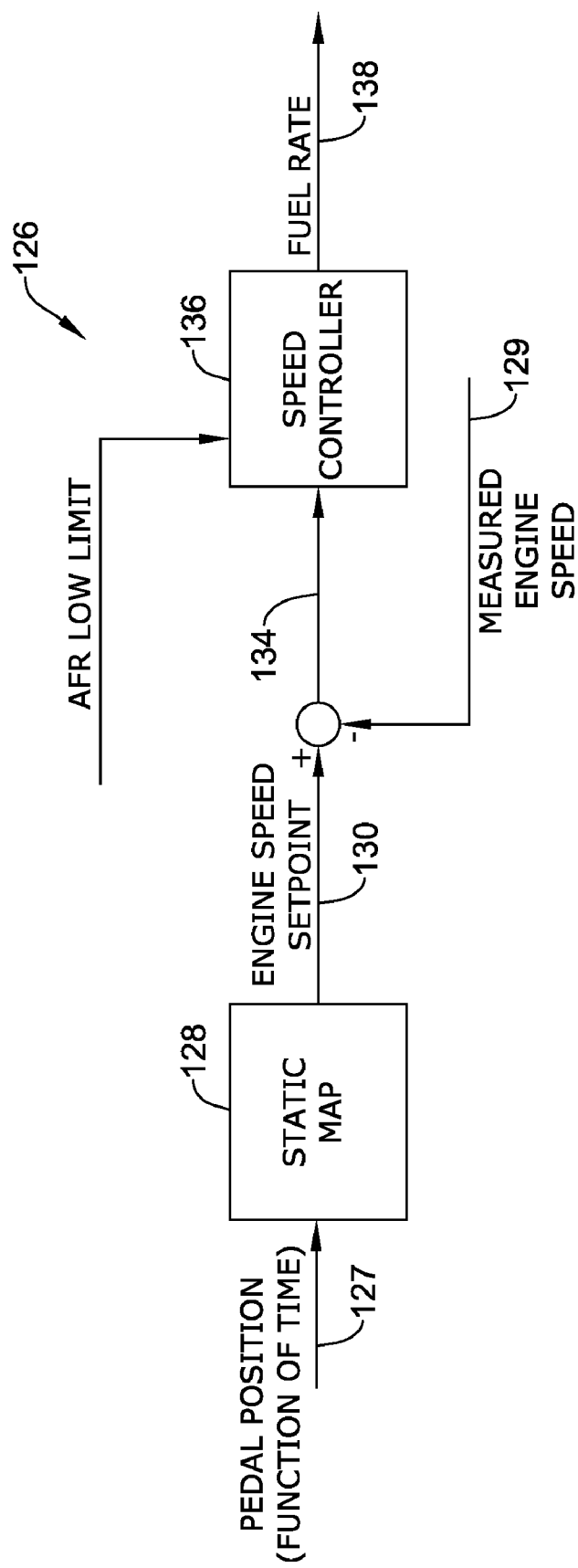
FIG. 5 is a schematic view of a prior art speed controller.

FIG. 5 is a schematic view of a prior art speed controller 126 which is conventionally used for controlling the fuel rate delivered by the fuel injectors to an engine. The speed controller 126 receives a pedal position signal 127 and a measured engine speed signal 129, both of which are functions of time. A pedal position signal 127 may be provided to a static map 128, which is a table that relates the pedal position to an engine speed set point 130. The engine speed set point 130 is compared to the measured engine speed signal 129, and an offset signal 134 is provided to a speed control block 136. Using the offset signal, the speed control block 136 then provides a fueling rate signal 138 to one or more of the fuel injectors of the engine. The speed controller 136 may contain a fuel rate limiter designed to maintain the AFR>AFR LOW LIMIT.

Figure 6:
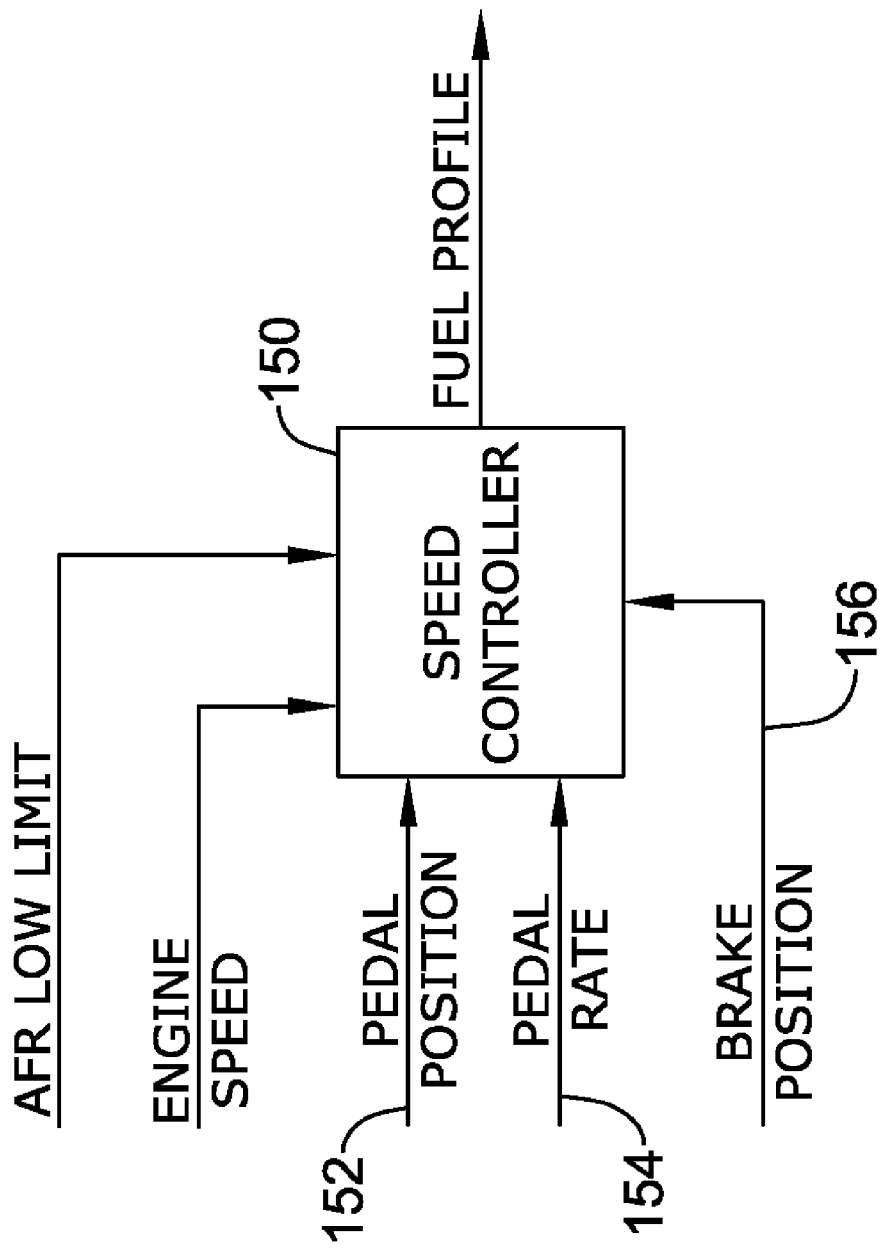
FIG. 6 is a schematic view of an illustrative speed controller in accordance with the present invention.

FIG. 6 is a schematic view of a speed controller in accordance with one illustrative embodiment of the present invention. One difference between the speed controller 150 of FIG. 6 and the speed controller 126 of FIG. 5 is that the speed controller 150 may receive both a pedal position signal 152 and a pedal change rate signal 154. By knowing the pedal change rate in addition to the current pedal position, the speed controller 150 may anticipate future fuel and/or air needs of the engine, and may adjust the fuel profile and/or air profile to meet those anticipated needs.

For example, the speed controller 150 may provide a larger fueling rate for a given pedal position when the pedal change rate is positive and higher than when the pedal change rate is positive and smaller. Likewise, the speed controller 150 may provide a smaller fueling rate for a given pedal position when the pedal change rate is negative and higher than when the pedal change rate is negative and smaller. Similarly, the speed controller 150 may provide a larger turbo boost (MAP) for a given pedal position when the pedal change rate is positive and higher than when the pedal change rate is positive and smaller. Likewise, the speed controller 150 may provide a smaller turbo boost (MAP) for a given pedal position when the pedal change rate is negative and higher than when the pedal change rate is negative and smaller. EGR and other engine parameters may be controlled in a similar manner.

In some cases, the speed controller 150 may receive a brake position signal 156. Brake pedal sensing may be used to anticipate future fuel side needs of the engine. For example, when a driver removes pressure from a brake pedal, it may be reasonable to assume that pressure will soon be applied to the fuel pedal. The speed controller 150 may use the brake position signal 156 to help anticipate future fuel needs.

Figure 7:
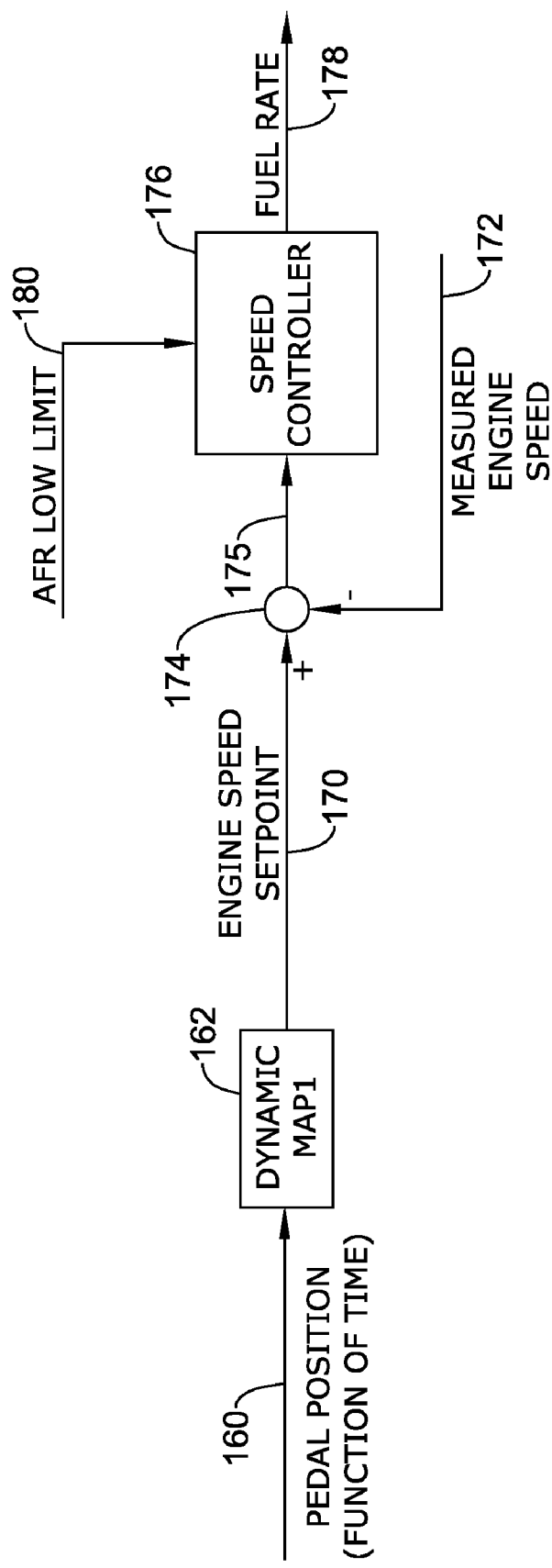
FIG. 7 is a schematic view of another illustrative speed controller in accordance with the present invention.

FIG. 7 is a schematic view of another illustrative speed controller in accordance with the present invention. In this illustrative embodiment, a pedal position signal 160 is provided to a first dynamic map 162. The first dynamic map 162 may translate the pedal position and a pedal change rate (and in some cases, further derivatives of the pedal position), and provide a corresponding engine speed set point 170. The first dynamic map 162 may help anticipate an acceleration of the engine and increase the current engine speed set point 170, when the pedal change rate is positive. Likewise, the first dynamic map 162 may anticipate a deceleration and decrease the current engine speed set point 170, when the pedal change rate is negative.

In the illustrative embodiment, the engine speed set point 170 is compared to a measured engine speed signal 172 via comparator 174, and an offset signal 175 is provided to a speed control block 176. Using the offset signal 175, the speed control block 176 provides a fueling rate signal 178 to one or more of the fuel injectors of the engine. In some embodiments, the speed controller 176 may also receive an AFR LOW LIMIT signal 180. As described above, the AFR LOW LIMIT signal 180 may be set to a value that if the estimated AFR of the engine falls below the AFR LOW LIMIT signal 180 value, smoke or other undesirable emissions may be expected to appear in the engine exhaust. To reduce emissions, and if the AFR falls below the AFR LOW LIMIT signal 180, the speed controller 176 may reduce the fuel rate 178 to at least temporarily increase the AFR provided to the engine.

Figure 8:
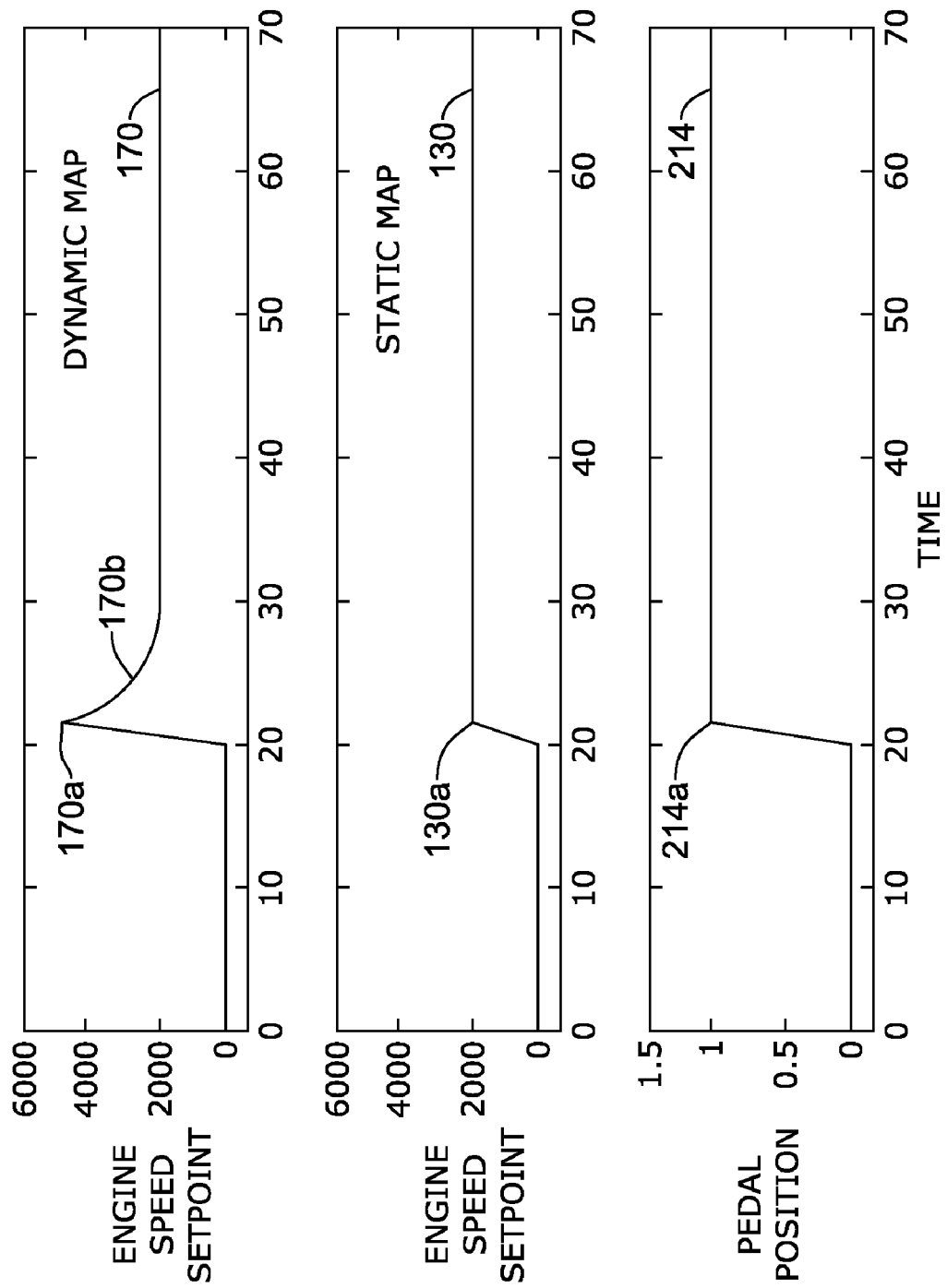
FIG. 8 is a chart showing an engine speed set point response of a speed controller that has a dynamic map versus a static map.

FIG. 8 is a chart showing an engine speed set point response of a speed controller that has a dynamic map versus a static map. An input pedal position signal is shown at 214, which includes a step 214a that rises from a lower position to a higher position. When a static map 128 is used and as shown and described with reference to FIG. 5, the corresponding engine speed set point 130 produced by the static map 128 (see FIG. 5) may have a step 130a that corresponds to the step in the input pedal position signal 214, as shown in FIG. 8. However, the corresponding step 130a in the engine speed signal 130 is merely reactive, and does not include any information or anticipate future needs of the engine.

In contrast, when a dynamic map 162 is used as shown and described with reference to FIG. 6, the corresponding engine speed set point 170 may have a corresponding step 170a that has a higher initial amplitude than the step 130 produced by the static map, followed by a decay region 170b in the engine speed set point 170, eventually leveling out at a level that is similar to that produced by the static map 128 (see FIG. 8). When a dynamic map 162 is used, the engine speed set point 170 may include information and/or anticipate future needs of the engine, and produce an engine speed set point 170 that attempts to satisfy those future needs.

In some embodiments, it is contemplated that the dynamic map 162 may translate the pedal position and a pedal change rate (and in some cases, further derivatives of the pedal position), and provide a corresponding engine speed set point 170. By doing so, the dynamic map 162 may help anticipate an acceleration of the engine and/or a deceleration of the engine, and produce an engine speed set point 170 that attempts to satisfy the anticipated future needs of the engine. This may, for example, help increase the performance and/or reduce the emissions of the engine.

In some embodiments, a combination of dynamic maps and look up tables may be used. For example, and in one illustrative embodiment, a first dynamic map, followed by a look up table, followed by a second dynamic map may be used. The first dynamic map may function as, for example, a pre-filter for the signal(s) entering the look up table, and the second dynamic map may function as a post filter for the signal(s) leaving the look up table. In some cases, the first dynamic filter may be a Kalman filter, an extended Kalman filter or any state observer filter, and the second dynamic filter may be the identity filter.

The look up table may be computed using any suitable method, but in some cases, using optimal or sub-optimal multi-parametric hybrid algorithms discussed above. Consistent with the multi-parametric hybrid algorithms, the lookup table may encode constraints on emission parameters in multiple engine operating modes, and may generate one or more engine control signals that are adapted to keep the engine emission or other parameters within the assigned constraints for the designated engine operating modes. In some embodiments, the look up table may accept emission control constraints as input parameters. The emission control constraints can be static or time-varying, and can be computed offline for a given set of engine operating modes, or in real or near real time, depending on the application.

Figure 9:
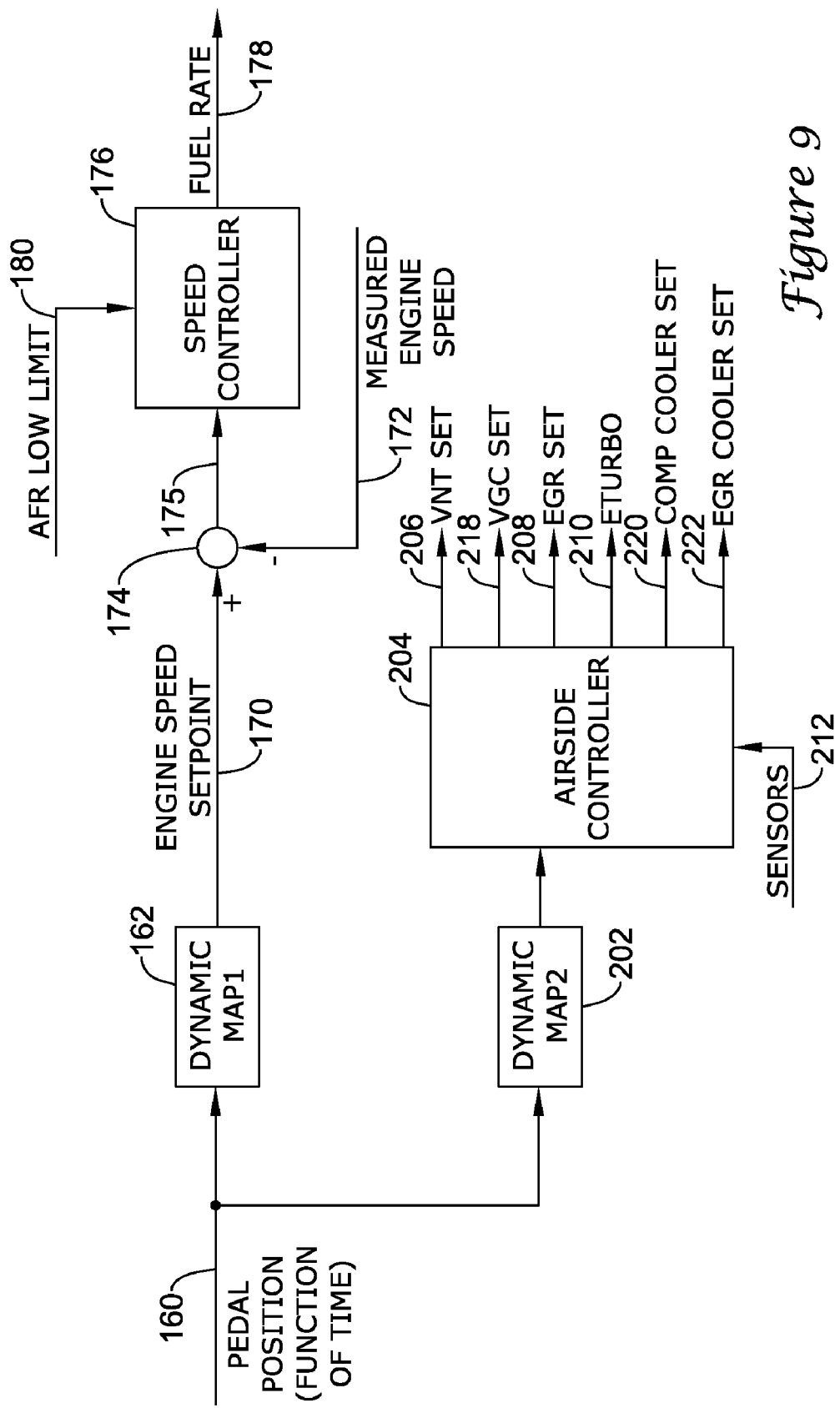
FIG. 9 is a schematic view of an illustrative engine controller in accordance with the present invention.

FIG. 9 is a schematic view of another illustrative engine controller in accordance with the present invention. The illustrative engine controller of FIG. 9 is the same as the illustrative embodiment shown in FIG. 7, but provides the pedal position to an air-side controller 204 of the engine.

In the illustrative embodiment, the pedal position signal 160 is provides to a second dynamic (or static) map 202, which relates information about the pedal position (e.g. pedal position, pedal change rate, etc.) to one or more air side control parameters. Using the output of the second dynamic map 202, the air side controller 204 may provide one or more control signals to help control the air side of the engine. The air side control signals may include, for example, a VNT SET signal 206, an EGR SET signal 208, a VGC SET signal 218, an ETURBO SET signal 210, a COMP COOLER SET signal 220, EGR COOLER SET signal 222, and/or any other suitable signal, as desired. Like above, the air side controller 204 may receive a number of other input signals 212 such as a MAP signal, a MAF signal, a MAT signal, a turbo speed signal, a NOX signal, a PM signal, and/or any other suitable signal, as desired. By knowing, for example, the pedal position and/or pedal change rate (and in some cases, further derivatives of the pedal position), some or all of the air side control signals may be adjusted to anticipate needed changes to improve engine response time, performance and/or emissions.

For example, if the pedal change rate is relatively high, the air side controller 204 may anticipate that extra turbo boost will be necessary and may change the VNT SET signal 206 and/or VGC SET signal 218 to immediately begin providing the anticipated turbo boost with little or no delay. The EGR SET signal 208, ETURBO SET signal 210, COMP COOLER SET signal 220, EGR COOLER SET signal 222, and/or any other control signal provided by the air side controller 204 may likewise be adjusted to cancel or otherwise compensate for disrupting effects caused by changes in pedal position and/or pedal change rate. This may help improve the responsiveness, performance and/or emissions of the engine.

In some cases, the number of other input signals 212 may include a brake position signal. Brake pedal sensing may be used to anticipate future air side needs of the engine. For example, when a driver removes pressure from a brake pedal, it may be reasonable to assume that pressure will soon be applied to the fuel pedal. The air side controller 204 may use the brake position signal to help anticipate future air side needs.

Figure 10:
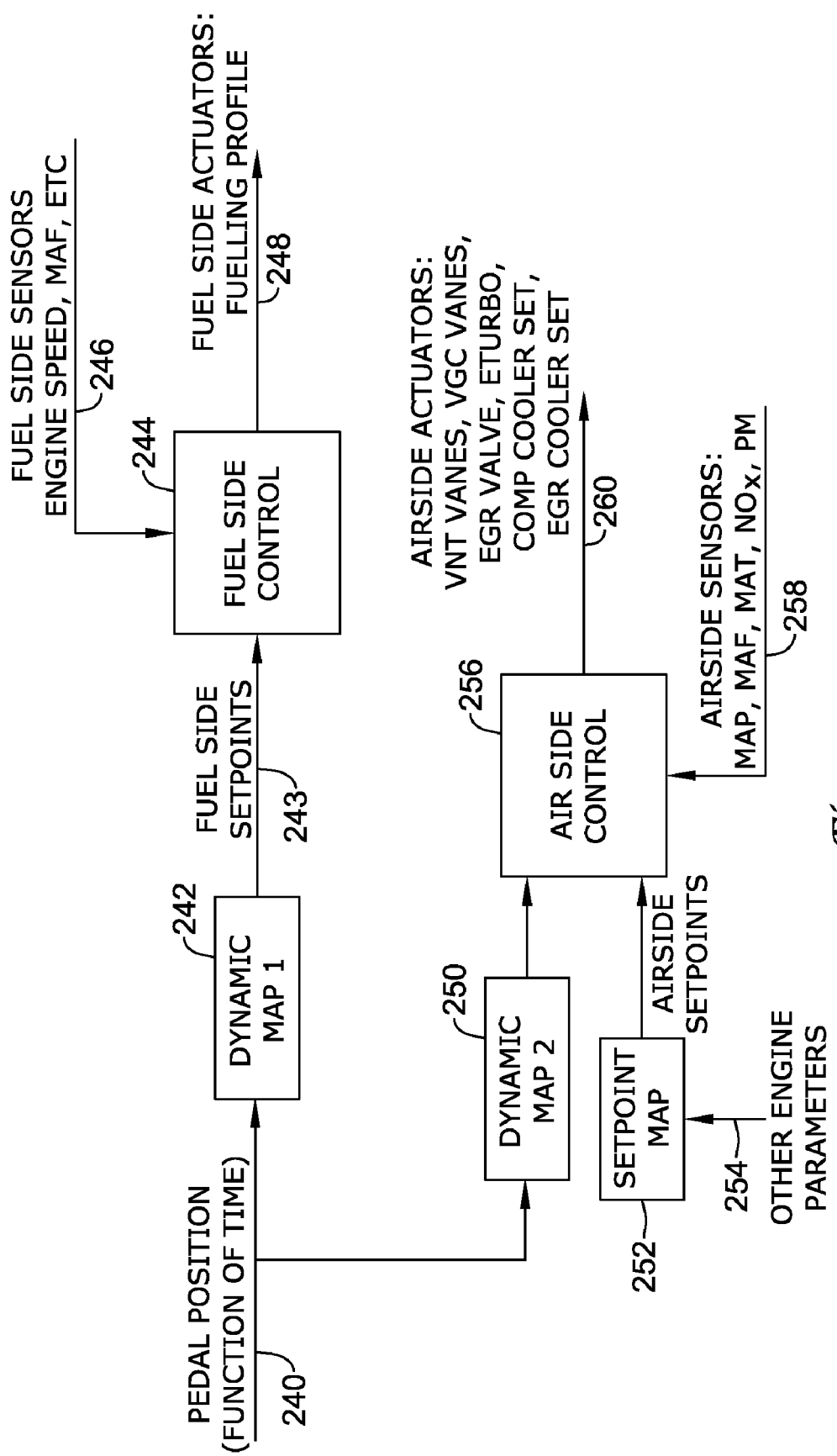
FIG. 10 is a schematic view of another illustrative engine controller in accordance with the present invention.

FIG. 10 is a schematic view of another illustrative engine controller in accordance with the present invention. In this illustrative embodiment, the pedal position 240 is provided to a fuel side position and rate map 242 and an air side position and rate map 250. The rate maps 242 and 250 may be dynamic maps, static maps, or combinations thereof.

In the illustrative embodiment, the fuel side rate map 242 may translate the pedal position and/or pedal change rate (and in some cases, further derivatives of the pedal position) into one or more fuel side set points 243. A fuel side controller 244 receives the fuel side set points 243, along with a number of fuel side sensor outputs 246 such as engine speed, MAF, MAP, MAT, etc., and provides a fueling profile 248 to the fuel injectors of the engine.

The air side rate map 250 may translate the pedal position and/or pedal change rate (and in some cases, further derivatives of the pedal position) into one or more air side parameters. Another air side set point map 252 may receive a number of other engine parameters 254 such as, a brake parameter, a temperature parameter, an outside air pressure parameter, a humidity parameter and/or any other suitable parameters, and may provide one or more air side set points. The air side set point map 252 may be a dynamic or static map, as desired.

An air side controller 256 receives the one or more air side parameters from the air side rate map 250, and in some cases, the one or more air side set points from the air side set point map 252, along with one or more air side sensor output signals such as MAP, MAF, MAT, NOX, PM, turbo speed, VNT POS, EGR POS, etc., and provide one or more air side control signals, such as VNT SET, EGR SET, VGC SET, ETURBO SET, COMP COOLER SET, EGR COOLER SET, and/or any other suitable control signal, as desired.

Figure 11:
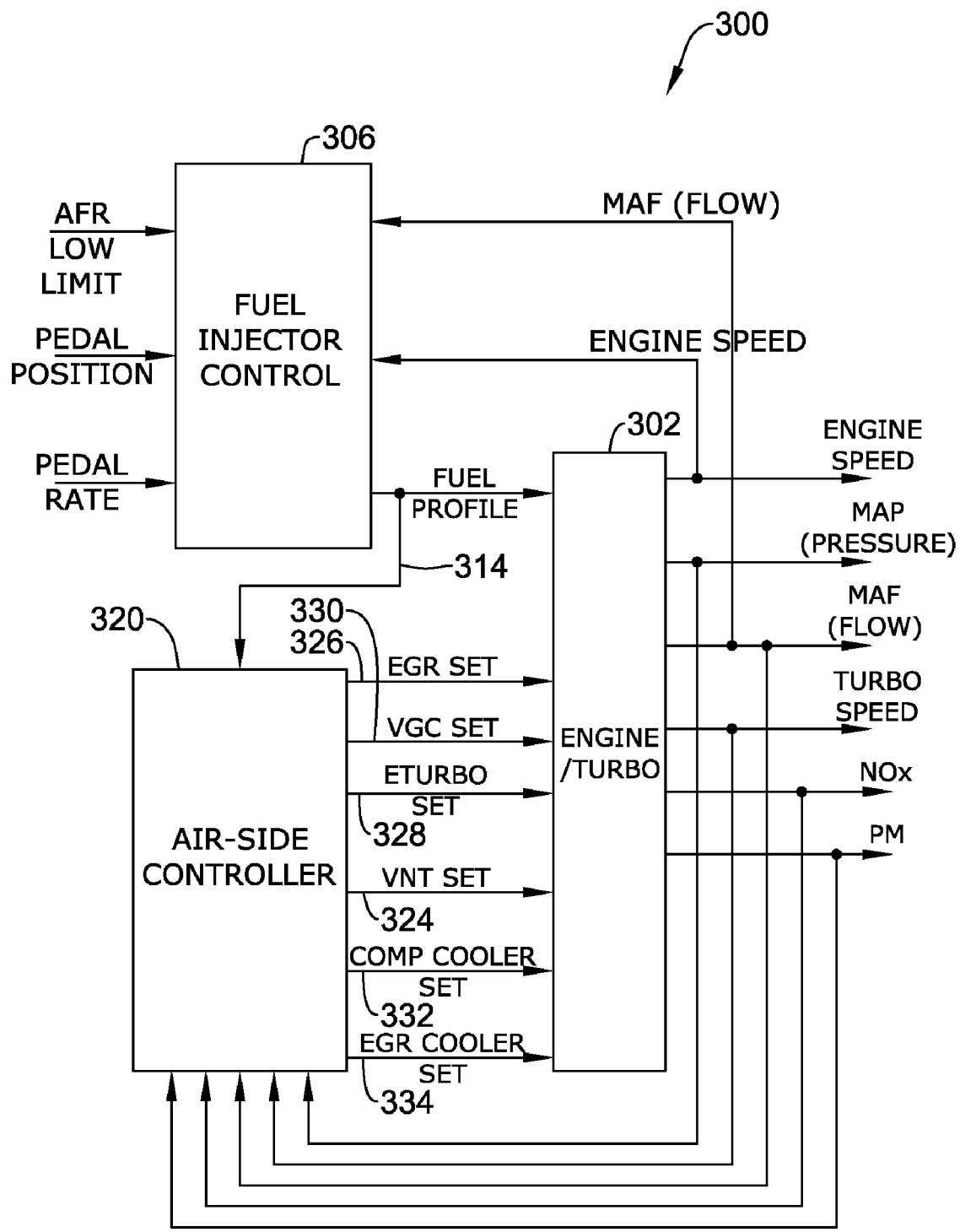
FIG. 11 is a schematic view of another illustrative diesel engine system in accordance with the present invention.

FIG. 11 is a schematic view of another illustrative diesel engine system in accordance with the present invention. This illustrative diesel engine system is generally shown at 300, and includes a diesel engine 302 that includes a variable nozzle turbine (VNT) turbocharger with electric motor assist and an Exhaust Gas Recirculation (EGR) Valve that is inserted between the engines' exhaust manifold and the engine's intake manifold. The illustrative diesel engine 302 also includes a variable geometry compressor (VGC), where in some cases, a VGC SET signal is used to set the vane position at the outlet of the compressor to provide a controlled amount of compressed air to the intake manifold 22.

A number of sensor outputs are provided for monitoring various parameters of the engine during operation. The illustrative sensor outputs include an engine speed parameter, an intake manifold air pressure (MAP) parameter, an intake manifold air flow (MAF) parameter, a turbo speed parameter, an NOX parameter and a PM parameter, as shown. More or less sensor outputs may be provided, if desired.

A fuel injector controller 306 is provided for controlling the fuel that is injected into the engine. The illustrative fuel injector controller 306 may be similar to the fuel injector controller 106 described above with reference of FIG. 4. The illustrative fuel injector controller 306 may include an air-fuel-ratio (AFR) estimator that receives the intake manifold air flow (MAF) parameter and a fuel rate parameter to estimate the air-fuel-ratio (AFR) going into the engine. In some cases, the air-fuel-ratio (AFR) estimator may keep the estimated AFR above a minimum AFR LOW LIMIT value, which if may help reduce smoke or other undesirable emissions that may occur at low AFR values.

The fuel injector controller 306 may control the fuel rate delivered by the fuel injectors to the engine. In the illustrative embodiment, a pedal position signal, a pedal rate signal, and an engine speed signal are used to calculate the desired amount of fuel for the engine. In some cases, stepping on the pedal increases the fuel flow in a manner dictated by one or more static and/or dynamic control maps, as further described above.

In the illustrative embodiment, an air side controller 320 is also provided. The air side controller 320 receives a number of engine parameters to help provide air-side control to the engine 302. For example, and in the illustrative embodiment, the air-side controller 320 may receive input signals such as a MAP sensor output, a MAF sensor output, a turbo speed signal, a NOX sensor output and/or a PM sensor output, as shown. These input parameters are only illustrative, and it is contemplated that more or less input signals may be received, depending on the application.

In the illustrative embodiment, the air side controller 320 also receives one or more fuel profile signals 314, which provide information related to the fuel profile that is currently provided to the engine 302. Based on the value of the received input parameters, including the fuel profile signal(s) 314, the illustrative air-side controller 320 provides a number of control outputs to help provide air-side control to the engine 302. For example, the air-side controller 320 may provide a VNT SET signal 324, an VGC SET signal 330, an EGR SET signal 326, an ETURBO SET signal 328, a COMP COOLER SET signal 332 and/or an EGR COOLER SET signal 334. Other control signals may also be provided by the air side controller 320, if desired.

By knowing the impact of fueling rate and/or a change in fueling rate on various engine parameters, such as MAP, MAF, MAT, turbo speed, NOX emissions, PM emissions, etc., the air side controller 320 may adjust one or more control signals such as VNT SET signal 324, VGC SET signal 330, EGR SET signal 326, the ETURBO SET signal 328, the COMP COOLER SET signal 332 and/or the EGR COOLER SET signal 334, to cancel or mitigate disrupting effects on, for example, MAP, MAF, turbo speed, NOX emissions, PM emissions, etc. This may help improve the responsiveness, performance and/or emissions of the engine.

Figure 12:
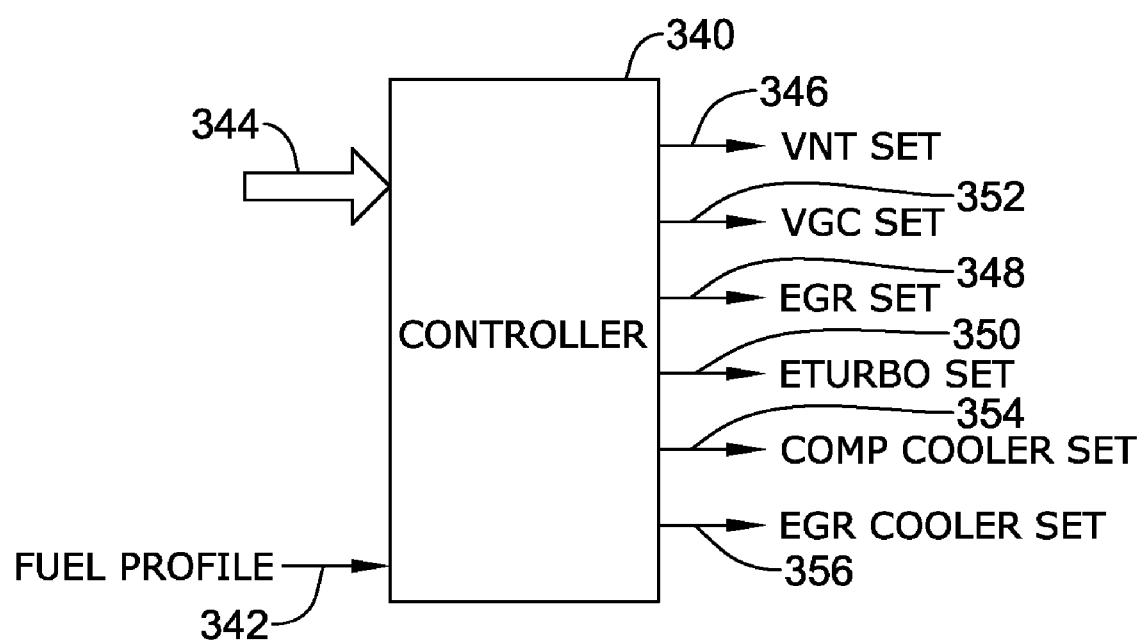
FIG. 12 is a schematic view of another illustrative air-side controller in accordance with the present invention.

FIG. 12 is a schematic view of another illustrative air-side controller in accordance with the present invention. The illustrative air-side controller 340 receives a fuel profile signal 342 along with one or more other parameters 344. The fuel profile signal 342 may include any number of fuel characteristics such as fuel delivery rate, change in fuel delivery rate, fuel timing, fuel pre-injection event(s), fuel post-injection event(s), fuel pulses, and/or any other fuel delivery characteristic, as desired. The one or more other parameters 344 may include, for example, a MAP parameter, a MAF parameter, a turbo speed parameter, a NOX parameter, a PM parameter, an engine speed parameter, a VNT position parameter, an EGR position parameter, a brake position parameter, an outside temperature parameter, an outside air pressure parameter, a humidity parameter and/or any other parameter, as desired.

The illustrative air-side controller 340 then provides one or more air side control signals to an engine. For example, the air-side controller 340 may provide a VNT SET signal 346, a VGC SET signal 352, an EGR SET signal 348, an ETURBO SET signal 350, a COMP COOLER SET signal 354, an EGR COOLER SET signal 356 and/or any other air-side control signal, as desired.

It is contemplated that the air-side controller 340 may be implemented in the form of online optimization and/or by using equivalent lookup tables computed with a hybrid multi-parametric algorithm. Hybrid multi-parametric algorithms may allow constraints on emission parameters as well as multiple system operating modes to be encoded into a lookup table which can be implemented in an Engine Control Unit (ECU) of a vehicle. The emission constraints can be time-varying signals which enter the lookup table as additional parameters. Hybrid multi-parametric algorithm are further described by F. Borrelli in "*Constrained Optimal Control of Linear and Hybrid Systems*", volume 290 of Lecture Notes in Control and Information Sciences, Springer, 2003, which is incorporated herein by reference.

Alternatively, or in addition, the air-side controller 340 may include one or more Proportional-Integral-Derivative (PID) control loops, one or more predictive constrained control loops—such as a Smith predictor control loop, one or more multiparametric control loops, one or more multivariable control loops, one or more dynamic matrix control loops, one or more statistical processes control loop, a knowledge based expert system, a neural network, fuzzy logic or any other suitable control mechanism, as desired. Also, it is contemplated that the air side controller 340 may provide commands and/or set points for lower-level controllers that are used to control the actuators of the engine. In some cases, the lower level controllers may be, for example, single-input-single-output (SISO) controllers such as PID controllers.

Figure 13:
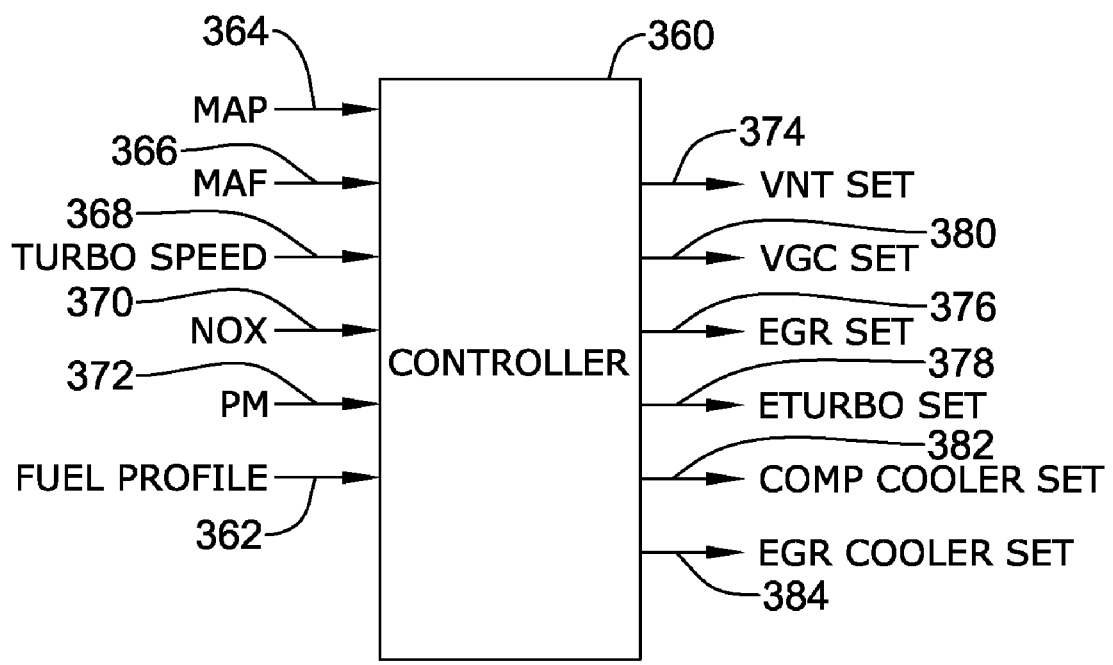
FIG. 13 is a schematic view of another illustrative air-side controller in accordance with the present invention.

FIG. 13 is a schematic view of another illustrative air-side controller in accordance with the present invention. The illustrative air-side controller 360 receives a fuel profile signal 362. The fuel profile signal 362 may include any number of fuel characteristics such as fuel delivery rate, change in fuel delivery rate, fuel timing, fuel pre-injection event(s), fuel post-injection event(s), fuel pulses, and/or any other fuel delivery characteristic, as desired. The illustrative air-side controller 360 may also receive other engine parameters including, for example, a MAP parameter 364, a MAF parameter 366, a turbo speed parameter 368, a NOX parameter 370, a PM parameter 372 and/or any other parameter, as desired.

The illustrative air-side controller 360 then provides one or more air side control signals to an engine. For example, the air-side controller 360 may provide a VNT SET signal 374, a VGC SET signal 380, an EGR SET signal 376, an ETURBO SET signal 378, a COMP COOLER SET signal 382 and/or an EGR COOLER SET signal 384 and/or any other air-side control signal, as desired.

It is contemplated that the air-side controller 360 may be implemented in the form of online optimization and/or by using equivalent lookup tables computed with a hybrid multi-parametric algorithm. Hybrid multi-parametric algorithms may allow constraints on emission parameters as well as multiple system operating modes to be encoded into a lookup table which can be implemented in an Engine Control Unit (ECU) of a vehicle. The emission constraints can be time-varying signals which enter the lookup table as additional parameters. Hybrid multi-parametric algorithm are further described by F. Borrelli in "*Constrained Optimal Control of Linear and Hybrid Systems*", volume 290 of Lecture Notes in Control and Information Sciences, Springer, 2003, which is incorporated herein by reference.

Alternatively, or in addition, the air-side controller 360 may include one or more Proportional-Integral-Derivative (PID) control loops, one or more predictive constrained control loops—such as a Smith predictor control loop, one or more multiparametric control loops, one or more multivariable control loops, one or more dynamic matrix control loops, one or more statistical processes control loop, a knowledge based expert system, a neural network, fuzzy logic or any other suitable control mechanism, as desired. Also, it is contemplated that the air side controller 360 may provide commands and/or set points for lower-level controllers that are used to control the actuators of the engine. In some cases, the lower level controllers may be, for example, single-input-single-output (SISO) controllers such as PID controllers.

Figure 14:
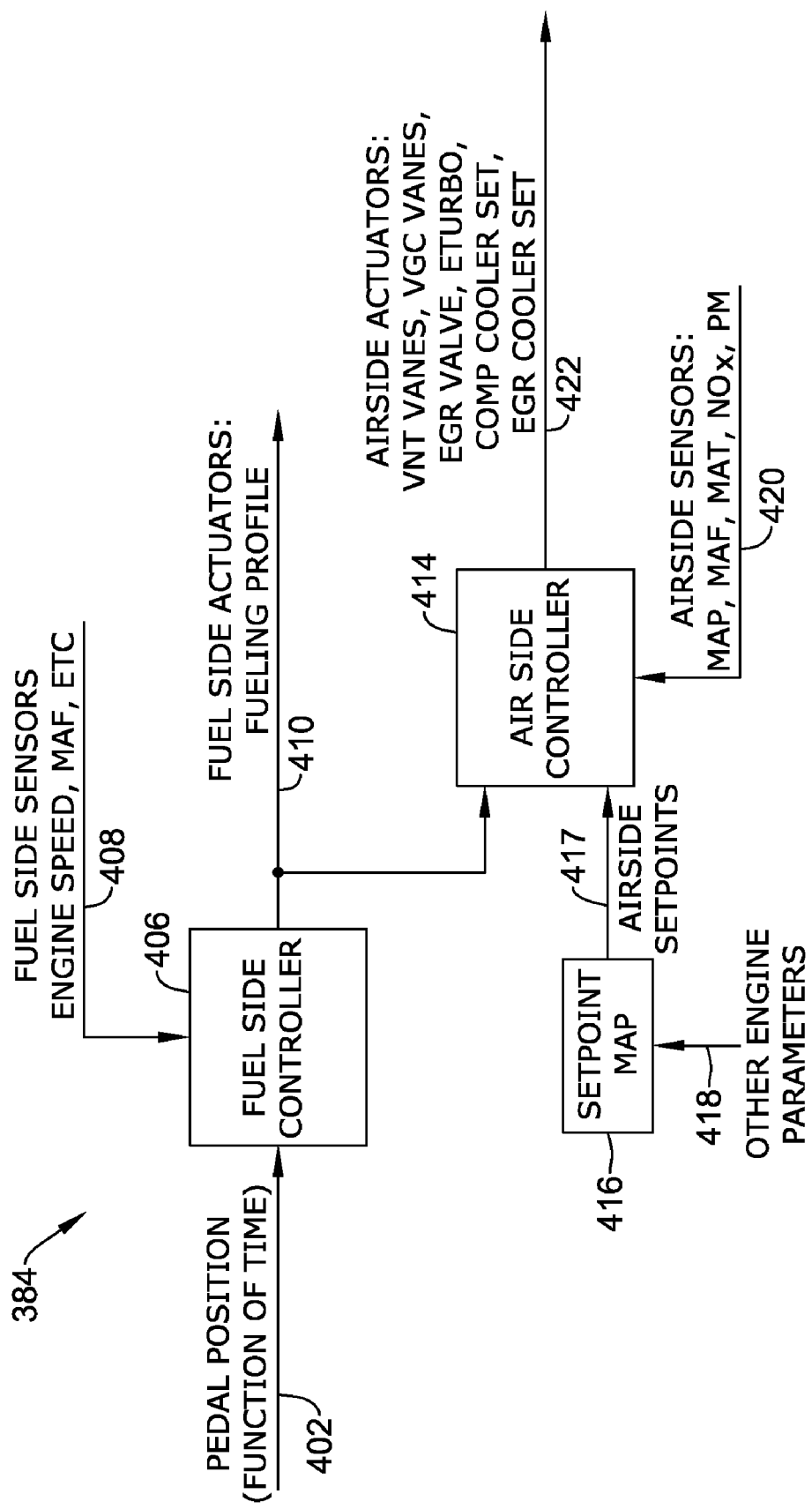
FIG. 14 is a schematic view of another illustrative air-side controller in accordance with the present invention.

FIG. 14 is a schematic view of another illustrative air-side controller in accordance with the present invention. The illustrative air-side controller is generally shown at 384. A pedal position signal 402 is provided to a Fuel Side Controller 406. The Fuel Side Controller 406 receives a number of input parameters such as an engine speed parameter, a MAF parameter, etc. via interface 408. Uses the pedal position signal 402 and the number of input parameters 408, the Fuel Side Controller 406 provides one or more fuel control signals 410 to one or more fuel side actuators, such as fuel injectors.

In the illustrative embodiment, one or more of the fuel control signals 410 are also provided to an Air Side Controller 414 as an input measured disturbance. The illustrative Air Side Controller 414 also receives a number of input signals from air side sensors via interface 420. The air side sensors may include, for example, a MAP sensor, a MAF sensor, a MAT sensor, a NOX sensor, a PM sensor, a turbo speed sensor, an engine speed sensor, and/or any other type of sensor, as desired. The illustrative Air Side Controller 414 may also receive a number of other air-side set points 417 from a Set Point Map 416. The Set Point Map 416 may translate one or more other engine parameters 418 into the one or more air side set points 417. The one or more other engine parameters may include, for example, a brake parameter, a temperature parameter, an outside air pressure parameter, a humidity parameter and/or any other desired engine parameter. The Set Point Map 416 may be a dynamic or static map, as desired.

Using the various input signals discussed above, the illustrative Air Side Controller 414 may provide one or more air side control signals 422. For example, the Air Side Controller 414 may provide a VNT SET signal, a VGC SET signal, an EGR SET signal, an ETURBO SET signal, a COMP COOLER SET signal, an EGR COOLER SET signal and/or any other air-side control signal, as desired. The illustrative embodiment may be capable of, for example, anticipating an acceleration and/or deceleration (e.g. via increased fuel rate 410), and then increase/decease the air delivery rate to the engine with little or no delay to help improve the responsiveness, performance and/or emissions of the engine.

Having thus described the preferred embodiments of the present invention, those of skill in the art will readily appreciated that the teachings found herein may be applied to yet other embodiments within the scope of the claims hereto attached.

What is claimed is:

1. A method for controlling an internal combustion engine having an air intake manifold, an exhaust gas manifold, one or more air-side actuators for adjusting one or more air side parameters of the engine, and one or more fuel injectors for injecting fuel into the engine, the method comprising the steps of:

injecting fuel into the internal combustion engine using at least one of the one or more fuel injectors;

providing one or more fuel signals related to the fuel injected into the engine;

predicting at least one air-side actuator target setpoint based, at least in part, on the one or more fuel signals; and adjusting one or more of the air-side actuators to the at least one air-side actuator target setpoint.

2. The method of claim 1 wherein at least one of the fuel signals is related to the change in fuel rate that is injected into the engine, and the predicting step predicts at least one air-side actuator target setpoint based, at least in part, on the at least one fuel signals that is related to the change in fuel rate.

3. The method of claim 1 wherein one of the one or more air-side actuators includes an exhaust gas recirculation (EGR) valve that receives exhaust gas from the exhaust gas manifold and provides an amount of exhaust gas to the air intake manifold, and wherein the predicting step predicts a EGR valve target setpoint based, at least in part, on the at least one fuel signals that is related to the change in fuel rate.

4. The method of claim 1, wherein one of the one or more air-side actuators includes a turbocharger fluidly coupled to the air intake manifold, and wherein the predicting step predicts a turbocharger target setpoint based, at least in part, on the at least one fuel signals that is related to the change in fuel rate.

5. A method for controlling an internal combustion engine, wherein the internal combustion engine includes one or more air-side actuators for adjusting one or more air side parameters of the engine, and further having one or more fuel injectors for injecting fuel into the engine, the internal combustion engine further includes an air intake manifold and a turbocharger fluidly coupled to the air intake manifold, the method comprising the steps of:

providing one or more fuel signals;

injecting fuel into the internal combustion engine via at least one of the one or more fuel injectors in accordance with at least one of the one or more fuel signals;

at least one of said one or more fuel signals being related to a change in fuel rate of the fuel that is injected into the engine by at least one of the one or more fuel injectors;

adjusting one or more of the air side actuators to adjust at least one of the one or more air-side parameters of the engine, wherein the step of adjusting the one or more air-side actuators is based, at least in part, on the at least one fuel signal that is related to the change in fuel rate; and predicting a target setpoint for the turbocharger based, at least in part, on the one or more fuel signals, and then adjusting the setpoint of the turbocharger to the target setpoint of the turbocharger.

6. A method for controlling an internal combustion engine, wherein the internal combustion engine includes one or more air-side actuators for adjusting one or more air side parameters of the engine, and further having one or more fuel injectors for injecting fuel into the engine, the internal combustion engine further includes an air intake manifold, the method comprising the steps of:

providing one or more fuel signals;

injecting fuel into the internal combustion engine via at least one of the one or more fuel injectors in accordance with at least one of the one or more fuel signals;

at least one of said one or more fuel signals being related to a change in fuel rate of the fuel that is injected into the engine by at least one of the one or more fuel injectors;

adjusting one or more of the air side actuators to adjust at least one of the one or more air-side parameters of the engine, wherein the step of adjusting the one or more air-side actuators is based, at least in part, on the at least one fuel signal that is related to the change in fuel rate; and predicting a target manifold air pressure (MAP) and/or a target manifold air flow (MAF) of the air in the air intake manifold based, at least in part, on the one or more fuel signals, and then adjusting the manifold air pressure (MAP) and/or manifold air flow (MAF) to the target manifold air pressure (MAP) and/or the target manifold air flow (MAF).

7. A method for controlling an internal combustion engine, wherein the internal combustion engine includes one or more air-side actuators for adjusting one or more air side parameters of the engine, and further having one or more fuel injectors for injecting fuel into the engine, the internal combustion engine further includes an air intake manifold and an exhaust gas manifold, wherein one of the one or more air-side actuators includes an exhaust gas recirculation (EGR) valve that receives exhaust gas from the exhaust gas manifold and provides an amount of exhaust gas to the air intake manifold, the method comprising the steps of:

providing one or more fuel signals;

injecting fuel into the internal combustion engine via at least one of the one or more fuel injectors in accordance with at least one of the one or more fuel signals;

at least one of said one or more fuel signals being related to a change in fuel rate of the fuel that is injected into the engine by at least one of the one or more fuel injectors;

adjusting one or more of the air side actuators to adjust at least one of the one or more air-side parameters of the engine, wherein the step of adjusting the one or more air-side actuators is based, at least in part, on the at least one fuel signal that is related to the change in fuel rate; and predicting a target setpoint of the EGR valve based, at least in part, on the one or more fuel signals, and then adjusting the setpoint of the EGR valve to the target setpoint of the EGR valve.

* * * * *